US012428962B1

(12) United States Patent
Miller et al.

(10) Patent No.: US 12,428,962 B1
(45) Date of Patent: *Sep. 30, 2025

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US); Randy W. Vondrell, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/177,421

(22) Filed: Apr. 11, 2025

Related U.S. Application Data

(63) Continuation-in-part of application No. 18/744,069, filed on Jun. 14, 2024, now Pat. No. 12,292,017.

(51) Int. Cl.
*F01D 5/02* (2006.01)
*F01D 25/24* (2006.01)
*F02C 7/36* (2006.01)

(52) U.S. Cl.
CPC ............. *F01D 5/02* (2013.01); *F01D 25/24* (2013.01); *F02C 7/36* (2013.01); *F05D 2260/96* (2013.01)

(58) Field of Classification Search
CPC ... F02K 3/06; F02C 7/36; F01D 9/041; F01D 5/02; F05D 2260/96; F05D 2220/36
See application file for complete search history.

(56) References Cited

U.S. PATENT DOCUMENTS

| 3,505,819 A | 4/1970 | Wilde |
| 3,534,556 A | 10/1970 | Wilde |

(Continued)

FOREIGN PATENT DOCUMENTS

| CN | 105177492 A | 12/2015 |
| CN | 105697730 A | 6/2016 |

(Continued)

OTHER PUBLICATIONS

Hobbs, et al., "Low Noise Research Fan Stage Design," NASA Contractor Report 195382, Mar. 1995. (Year: 1995).*

(Continued)

*Primary Examiner* — David P. Olynick
(74) *Attorney, Agent, or Firm* — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. The fan comprises a plurality of fan blades that define a fan diameter and a BEAL. The fan case comprises an inlet and an inlet length between the inlet and the fan. The acoustic spacing comprises a distance between the fan and the plurality of outlet guide vanes, and in combination with the BEAL determines an acoustic spacing ratio of the gas turbine engine. The combination of acoustic spacing and corrected specific thrust provide enhanced propulsive efficiency.

20 Claims, 14 Drawing Sheets

(56) References Cited

U.S. PATENT DOCUMENTS

| | | | |
|---|---|---|---|
| 5,169,288 | A | 12/1992 | Gliebe et al. |
| 5,299,914 | A | 4/1994 | Schilling |
| 6,195,983 | B1 | 3/2001 | Wadia et al. |
| 7,118,331 | B2 | 10/2006 | Shahpar |
| 7,374,404 | B2 | 5/2008 | Schilling et al. |
| 7,374,493 | B2 | 5/2008 | Decker et al. |
| 9,540,938 | B2 | 1/2017 | Topol et al. |
| 10,107,191 | B2 | 10/2018 | Gilson et al. |
| 10,247,018 | B2 | 4/2019 | Topol et al. |
| 10,458,426 | B2 | 10/2019 | Wilkin, II |
| 10,584,632 | B1 | 3/2020 | Kannangara et al. |
| 10,626,490 | B2 | 4/2020 | Heuer et al. |
| 10,634,233 | B1 | 4/2020 | Smith |
| 10,641,182 | B1 | 5/2020 | Bemment |
| 10,677,264 | B2 | 6/2020 | Moniz et al. |
| 10,711,797 | B2 | 7/2020 | Kroger et al. |
| 10,815,886 | B2 | 10/2020 | Kroger et al. |
| 11,174,816 | B2 | 11/2021 | Banham et al. |
| 11,199,196 | B2 | 12/2021 | Breen |
| 11,377,958 | B2 | 7/2022 | Lemarchand et al. |
| 11,473,507 | B2 | 10/2022 | Molesini et al. |
| 11,486,312 | B2 | 11/2022 | Molesini et al. |
| 11,578,668 | B2 | 2/2023 | Ortiz et al. |
| 11,608,786 | B2 | 3/2023 | Schwarz et al. |
| 11,994,072 | B1 | 5/2024 | Bemment et al. |
| 12,012,898 | B2 | 6/2024 | Miller et al. |
| 2006/0228206 | A1 | 10/2006 | Decker et al. |
| 2008/0283676 | A1 | 11/2008 | Jain et al. |
| 2009/0082976 | A1 | 3/2009 | Anuzis et al. |
| 2011/0056183 | A1 | 3/2011 | Sankrithi et al. |
| 2012/0288358 | A1 | 11/2012 | Balk |
| 2014/0140824 | A1 | 5/2014 | Sheridan |
| 2014/0161591 | A1 | 6/2014 | Venter |
| 2014/0227084 | A1 | 8/2014 | Sheridan |
| 2014/0283500 | A1 | 9/2014 | Sabnis |
| 2015/0044028 | A1 | 2/2015 | Lord et al. |
| 2016/0208651 | A1 | 7/2016 | Dolman et al. |
| 2016/0215729 | A1 | 7/2016 | Sabnis |
| 2016/0363137 | A1 | 12/2016 | Topol et al. |
| 2017/0022810 | A1 | 1/2017 | Joseph et al. |
| 2017/0184053 | A1 | 6/2017 | Harvey et al. |
| 2017/0298954 | A1 | 10/2017 | Qui et al. |
| 2017/0314562 | A1 | 11/2017 | Rose |
| 2018/0030926 | A1 | 2/2018 | Eckett et al. |
| 2018/0106274 | A1 | 4/2018 | Moniz et al. |
| 2018/0135557 | A1 | 5/2018 | Pouyau et al. |
| 2018/0195465 | A1 | 7/2018 | Bruhat |
| 2018/0252166 | A1 | 9/2018 | Pointon |
| 2018/0258794 | A1 | 9/2018 | Gedin et al. |
| 2018/0259005 | A1 | 9/2018 | Nikola et al. |
| 2018/0274443 | A1 | 9/2018 | Pointon et al. |
| 2018/0363123 | A1 | 12/2018 | Lapierre et al. |
| 2019/0010870 | A1 | 1/2019 | Miller et al. |
| 2019/0128123 | A1 | 5/2019 | Paruchuri et al. |
| 2019/0170240 | A1 | 6/2019 | Charrier et al. |
| 2019/0292944 | A1 | 9/2019 | Mason et al. |
| 2019/0360578 | A1 | 11/2019 | Chevillot et al. |
| 2019/0376529 | A1 | 12/2019 | Joseph et al. |
| 2020/0032716 | A1 | 1/2020 | Di Giovanni et al. |
| 2020/0132186 | A1 | 4/2020 | Dombek et al. |
| 2020/0166121 | A1 | 5/2020 | Di Giovanni et al. |
| 2020/0208577 | A1 | 7/2020 | Di Giovanni et al. |
| 2020/0277901 | A1 | 9/2020 | Bemment |
| 2020/0347785 | A1 | 11/2020 | Morin et al. |
| 2020/0400069 | A1 | 12/2020 | Aguilera et al. |
| 2020/0400099 | A1 | 12/2020 | Bemment et al. |
| 2021/0108572 | A1 | 4/2021 | Khalid et al. |
| 2021/0222563 | A1 | 7/2021 | Mohankumar et al. |
| 2021/0222632 | A1 | 7/2021 | Bemment et al. |
| 2022/0042461 | A1 | 2/2022 | Molesini et al. |
| 2022/0042462 | A1 | 2/2022 | Molesini et al. |
| 2022/0042463 | A1 | 2/2022 | Molesini et al. |
| 2022/0042464 | A1 | 2/2022 | Molesini et al. |
| 2022/0049621 | A1 | 2/2022 | Sawyers-Abbott et al. |
| 2022/0049656 | A1 | 2/2022 | Sawyers-Abbott et al. |
| 2022/0056811 | A1 | 2/2022 | Molesini et al. |
| 2022/0099035 | A1 | 3/2022 | Bemment et al. |
| 2023/0151777 | A1 | 5/2023 | Bifulco et al. |
| 2024/0151185 | A1 | 5/2024 | Miller et al. |
| 2024/0218828 | A1 | 7/2024 | Niergarth et al. |
| 2024/0363276 | A1 | 10/2024 | Vetters et al. |

FOREIGN PATENT DOCUMENTS

| | | | |
|---|---|---|---|
| CN | 110791728 | A | 2/2020 |
| CN | 112796884 | A | 5/2021 |
| DE | 102022133702 | A1 | 3/2023 |
| EP | 2 360 391 | A1 | 8/2011 |
| EP | 3 372 808 | A2 | 9/2018 |
| EP | 3 543 476 | A1 | 9/2019 |
| EP | 3 591 191 | A1 | 1/2020 |
| EP | 3 670 871 | A1 | 6/2020 |
| EP | 3 085 897 | B1 | 9/2021 |
| FR | 2991694 | B1 | 8/2015 |
| JP | 2006037979 | A | 2/2006 |
| WO | WO 2014/066503 | A1 | 5/2014 |
| WO | WO 2014/170566 | A1 | 10/2014 |
| WO | WO 2019/016491 | A1 | 1/2019 |

OTHER PUBLICATIONS

Christopher E. Hughes, "Aerodynamic Performance of Scale-Model Turbofan Outlet Guide Vanes Designed for Low Noise," AIAA-2002-0374, NASA/TM—2001-211352, Dec. 2001. (Year: 2001).*

Burak Kaplan, et al., "Design of a Highly Efficient Low-Noise Fan for Ultra-High Bypass Engines," GT2006-90363, May 8-11, 2006. (Year: 2006).*

Anderson et al., "Advanced Gearbox Technology Final Report," Allison Gas Turbine Division, General Motors Corporation, NASA CR-179625 (Aug 1984-Jan. 1987) (156 pages).

Gliebe et al., *Ultra-High Bypass Engine Aeroacoustic Study*. No. NASA/CR-2003-212525, 2003.

Hart, K. Basic Architecture and Sizing of Commercial Aircraft Gas Turbine Oil Feed Systems. Proceedings of ASME Turbo Expo 2008. Jun. 9-13, 2008. (Year: 2008).

Hendricks et al., "Performance and Weight Estimates for an advanced Open Rotor Engine," Prepared for the 48th Joint Propulsion Conf and Exhibit cosponsored by the AIAA, ASME, SAE and ASEE, Atlanta, GA, NASA/TM—2012-217710, AIAA-2012-3911 (Sep. 2012) (20 pages).

Machine Design. Spur versus planetary gearheads for de servomotors. Accessed from https://www.machinedesign.com/archive/article/21813332/spur-versus-planetary-gearheads-for-dc-servomotors (Year: 2000).

Max Power. Know Which Gear is More Efficient. accessed from http://maxpowergears.com/know-gear-efficient/ (Year: 2017).

Ultrafan: The Ultimate TurboFan. Rolls-Royce PLC, 2022. www.rolls-royce.com/-/media/Files/R/Rolls-Royce/documents/innovation/ ultrafan-fact-sheet.pdf. (Year: 2022).

* cited by examiner

| Engine | As (255) | c(210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9(#1) |
| #2 | 3.0 | 10 | 0.350 | 24.0 | 20 | 3.0 | 30 | 0.56 | 1.80 | 73.8(#1) |
| #3 | 9.0 | 26 | 0.300 | 30.0 | 24 | 2.1 | 31 | 2.30 | 1.88 | 85.7(#2) |
| #4 | 11.0 | 20 | 0.250 | 26.0 | 22 | 3.0 | 35 | 1.53 | 2.40 | 69.3(#1) |
| #5 | 2.0 | 8 | 0.200 | 28.0 | 22 | 3.0 | 30 | 0.22 | 2.96 | 70.0(#1) |
| #6 | 6.0 | 16 | 0.250 | 30.0 | 20 | 2.5 | 45 | 0.80 | 2.98 | 80.0(#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6(#2) |
| #9 | 10.0 | 18 | 0.340 | 32.0 | 22 | 3.0 | 31 | 1.20 | 2.79 | 97.0(#2) |
| #10 | 10.0 | 20 | 0.330 | 35.0 | 16 | 2.8 | 55 | 1.22 | 2.91 | 104.5(#3) |
| #11 | 21.0 | 29 | 0.210 | 38.0 | 16 | 2.5 | 31 | 3.00 | 2.80 | 96.2(#3) |
| #12 | 18.0 | 35 | 0.290 | 40.0 | 20 | 3.0 | 36 | 3.49 | 1.72 | 112.7(#3) |
| #13 | 13.1 | 12.8 | 0.275 | 31.9 | 22 | 2.2 | 43.0 | 0.47 | 12.75 | 88.0(#2) |
| #14 | 13.9 | 12.8 | 0.275 | 31.9 | 22 | 2.2 | 43.0 | 0.47 | 13.53 | 88.0(#2) |
| #15 | 19.5 | 13.5 | 0.210 | 28.0 | 14 | 2.9 | 55.0 | 0.68 | 10.11 | 80.0(#2) |
| #16 | 16.5 | 18.5 | 0.270 | 37.2 | 16 | 2.3 | 53.0 | 0.95 | 7.73 | 101.9(#3) |
| #17 | 16.5 | 18.5 | 0.270 | 32.0 | 16 | 2.3 | 53.0 | 1.10 | 6.65 | 87.7(#2) |
| #18 | 14.5 | 12.8 | 0.280 | 31.4 | 20 | 3.0 | 43.0 | 0.53 | 9.12 | 87.2(#2) |
| #19 | 10.3 | 12.8 | 0.275 | 28.0 | 22 | 2.2 | 43.0 | 0.54 | 8.80 | 77.2(#1) |
| #20 | 5.5 | 14.0 | 0.275 | 29.0 | 22 | 2.2 | 43.0 | 0.62 | 4.07 | 80.0(#2) |
| #21 | 3.8 | 11.0 | 0.275 | 33.0 | 22 | 2.2 | 43.0 | 0.34 | 5.18 | 91.0(#2) |
| #22 | 14.0 | 12.0 | 0.275 | 32.0 | 22 | 2.2 | 43.0 | 0.41 | 15.55 | 88.3(#2) |

FIG. 4

| HPC EXIT AREA | REDLINE EGT | SLS THRUST | CST |
|---|---|---|---|
| 29.1 | 1153 | 39262 | 53.6 |
| 27.1 | 1205 | 39258 | 64.5 |
| 28.4 | 1071 | 39292 | 52.2 |
| 26.1 | 1123 | 39288 | 64.6 |
| 24.7 | 1160 | 39285 | 74.5 |
| 26.2 | 1155 | 39262 | 66.2 |
| 27.0 | 1207 | 39257 | 64.9 |
| 27.0 | 1125 | 39289 | 60.6 |
| 24.6 | 1161 | 39285 | 75.0 |
| 29.1 | 1152 | 39262 | 53.3 |
| 28.4 | 1071 | 39292 | 52.1 |
| 27.0 | 1123 | 39287 | 60.3 |

US 12,428,962 B1

GAS TURBINE ENGINE WITH ACOUSTIC SPACING OF THE FAN BLADES AND OUTLET GUIDE VANES

CROSS-REFERENCE TO RELATED APPLICATIONS

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

DETAILED DESCRIPTION

Figure 1:
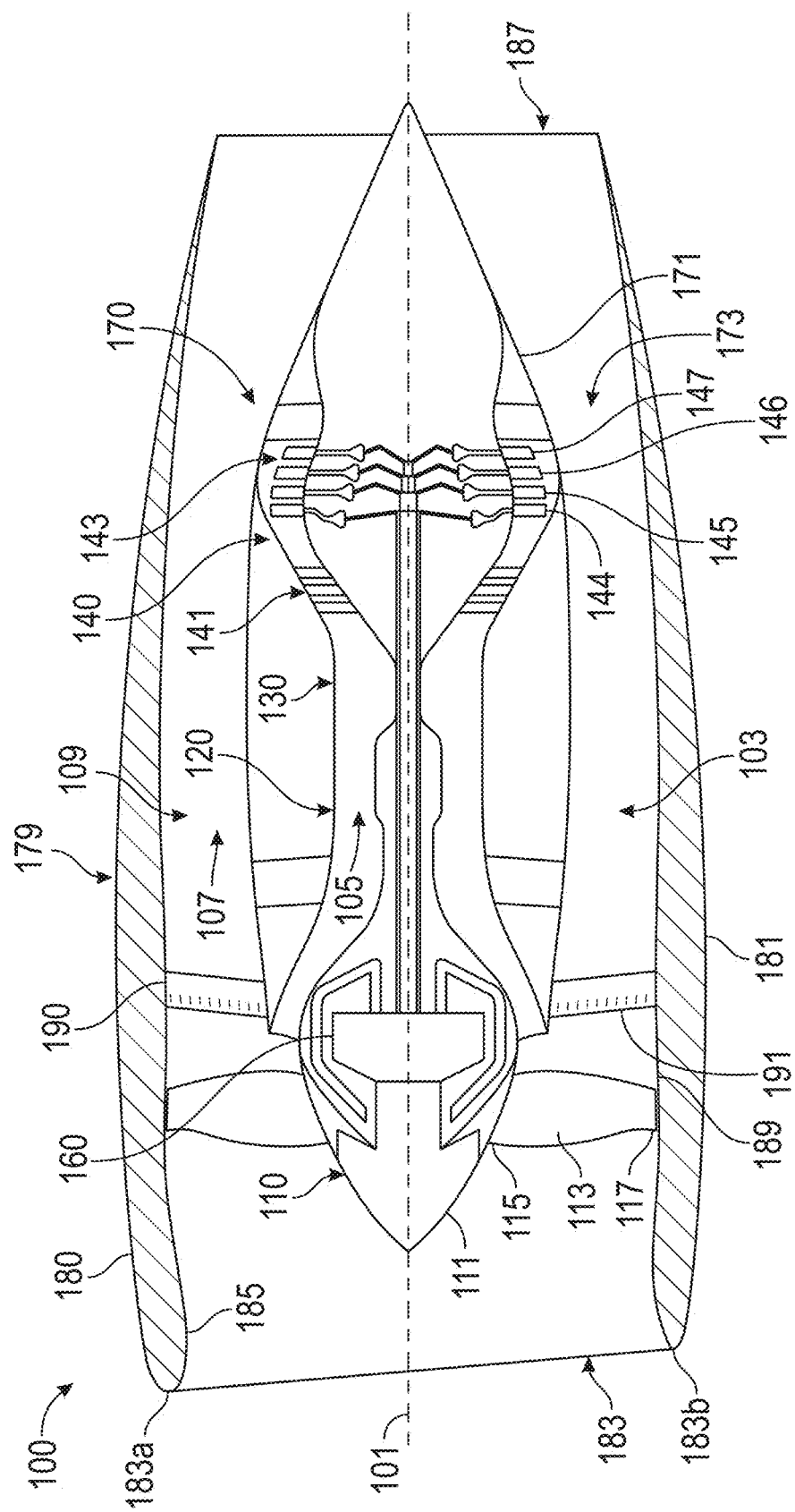
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein in this application and in the claims, the terms "forward" and "fore" refer to an upstream direction oriented towards an inlet of the gas turbine engine.

As used herein in this application and in the claims, the terms "aft" or "behind" refer to a downstream direction oriented towards an outlet of the gas turbine engine.

As used herein in this application and in the claims, the term "axial" refers to a dimension extending along a central longitudinal axis of the gas turbine engine from a forward portion of the gas turbine engine to an aft portion of the gas turbine engine.

As used herein in this application and in the claims, the term "radial" refers to a dimension extending radially outwards from the central longitudinal axis.

As used herein in this application and in the claims, the term "OGV" refers to an outlet guide vane of the gas turbine engine.

The phrases "from X to Y" and "between X and Y" each refers to a range of values inclusive of the endpoints (i.e., refers to a range of values that includes both X and Y).

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

The cooled cooling air systems contemplated by the present disclosure may include a thermal bus cooled cooling air system (see, e.g., FIGS. 8 and 9) or a dedicated heat exchanger cooled cooling air system (i.e., a cooled cooling air system including a heat sink heat exchanger dedicated to the cooled cooling air system); a bypass heat exchanger cooled cooling air system having a heat sink heat exchanger thermally coupled to an airflow through a bypass passage; an air-to-air cooled cooling air system (i.e., a cooled cooling air system having a heat sink heat exchanger configured to transfer heat to an airflow); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.); or a combination thereof.

In one or more of the exemplary cooled cooling air systems described herein, the cooled cooling air system may receive the cooling air from a downstream end of a high pressure compressor (i.e., a location closer to a last stage of the high pressure compressor), an upstream end of the high pressure compressor (i.e., a location closer to a first stage of the high pressure compressor), a downstream end of a low pressure compressor (i.e., a location closer to a last stage of the low pressure compressor), an upstream end of the low pressure compressor (i.e., a location closer to a first stage of the low pressure compressor), a location between compressors, a bypass passage, a combination thereof, or any other suitable airflow source.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. For example, with reference to the exemplary engine discussed below with reference to FIG. 6, the term redline EGT refers to a maximum permitted takeoff temperature of an airflow after the first stator 409 downstream of the last stage of rotor blades 407 of the HP turbine 432 (at location 433 into the first of the plurality of LP turbine rotor blades 411). In embodiments wherein the engine is configured as a three spool engine (as compared to the two spool engine of FIG. 6; see FIG. 15), the term redline EGT refers to a maximum permitted takeoff temperature of an airflow after the first stator downstream of the last stage of rotor blades of the intermediate speed turbine (see intermediate speed turbine of the engine of FIG. 15). The term redline EGT is sometimes also referred to as an indicated turbine exhaust gas temperature or indicated turbine temperature.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (e.g., chord length, span, stagger angle, radius ratio, number of blades), can provide desirable improvements in noise reductions for the gas turbine engine.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.45. In other examples, the FPR can be greater than 1.30 or 1.35, and less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective optimal rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be 2-4. For example, the gear ratio can be 2-2.9, 3.2-4, or 3.25-3.75. In some examples, a gear ratio of the gearbox assembly can be greater than 4, such as 4.1-6.0 or 4.1-5.0.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183a of the inlet 183, i.e., a portion of the inlet 183 at a twelve o'clock position when the gas turbine engine 100 is mounted to an aircraft, extends forward of a bottom portion 183b of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
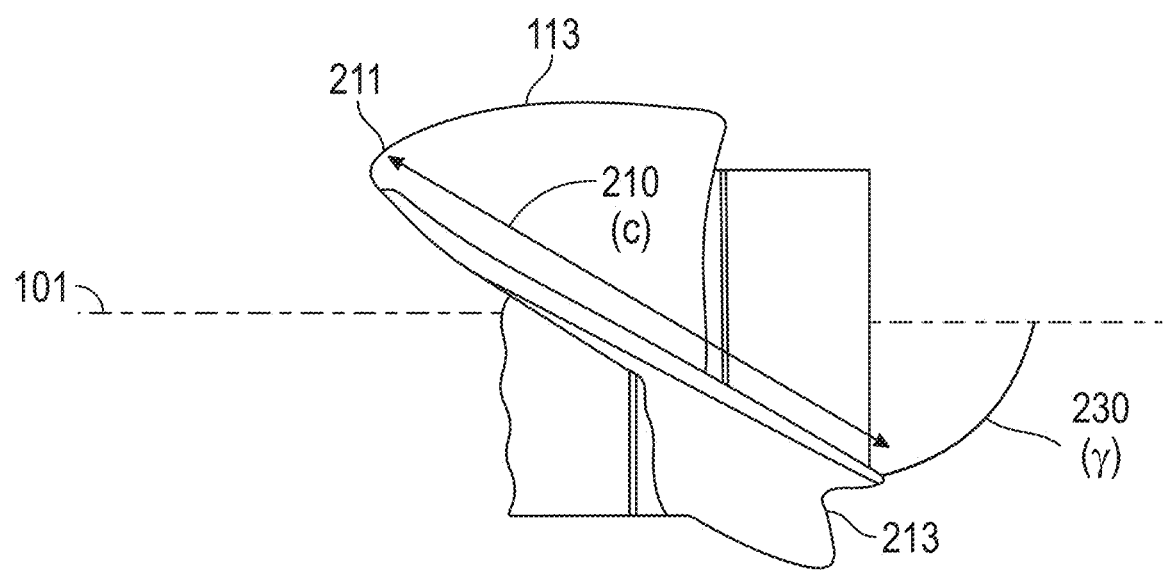
FIG. 2 shows a top view of a fan blade for a gas turbine engine, according to one example.
Figure 3:
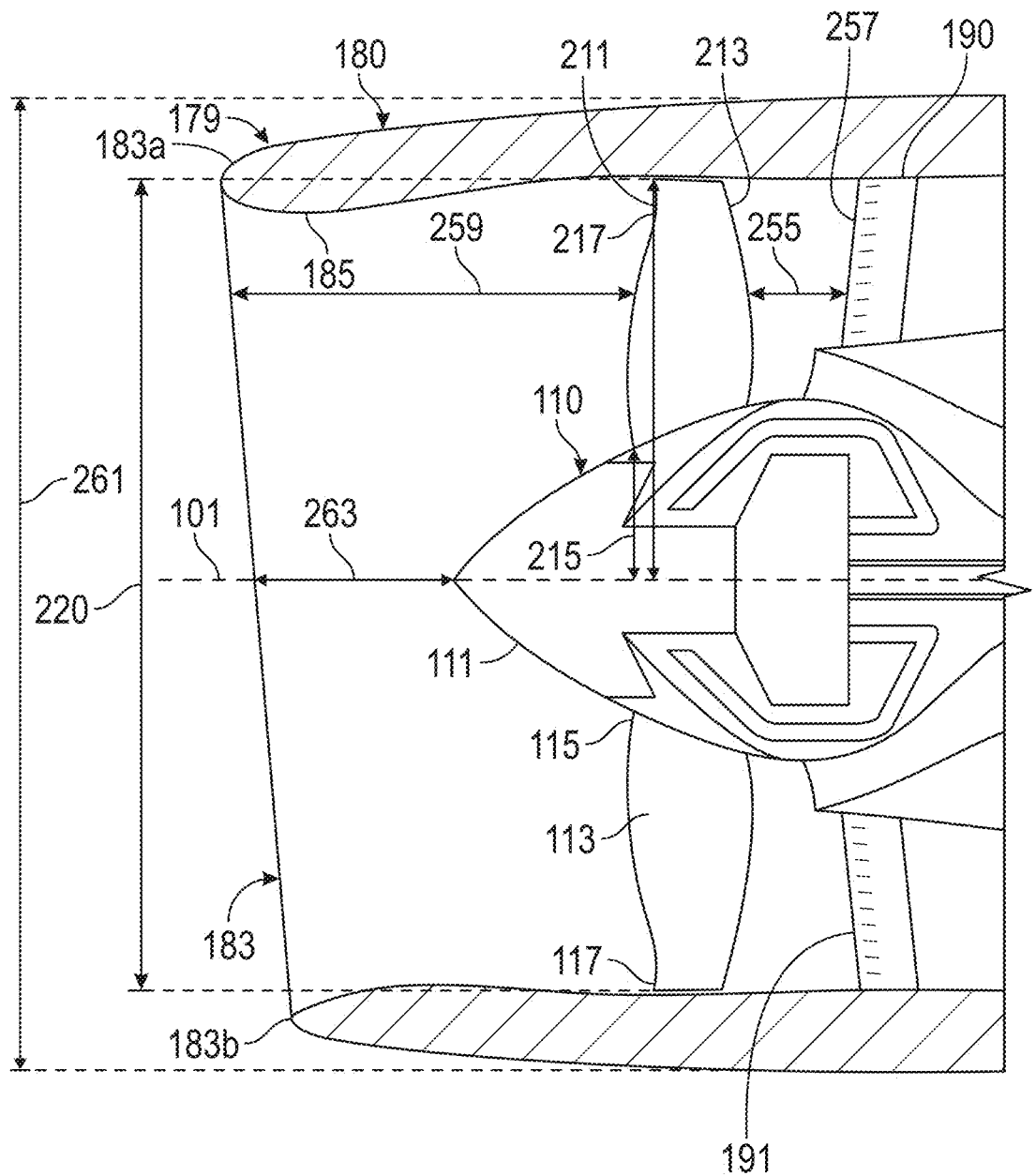
FIG. 3 is a partial view of a gas turbine engine with an acoustic spacing, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing(s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing(s) between adjacent fan blades is calculated by multiplying a fan diameter by $\pi$ and dividing the product by the number ($N_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle (γ) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{S(1-rr)N_b}\cos(\gamma) \quad (1)$$

where c is the chord length at 75% span, rr is the radius ratio of the fan, S is the full span of the fan blade (i.e., as measured at a 100% span position at the blade leading edge), γ is the stagger angle, and $N_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

65≤FBD #1<80 inches
80≤FBD #2<95 inches
95≤FBD #3<115 inches

TABLE 1

| Symbol | Description | Exemplary Ranges for Use with BEAL |
|---|---|---|
| c | Chord length at 75% span position (ranges based on FBD) | 5" to 28" (for FBD#1)<br>6" to 33" (for FBD#2)<br>7" to 35" (for FBD#3) |
| S | Span of fan blade at 100% span position (ranges based on FBD) | 24" to 30" (for FBD#1)<br>28" to 36" (for FBD#2)<br>32" to 40" (for FBD#3) |
| rr | Radius ratio (range) | 0.2 to 0.35 |
| Nv | Number of OGVs (ranges) | 1.5Nb to 3Nb, 1.8Nb to 2.4Nb, 2.0Nb to 2.5Nb, or 2.2Nb to 2.6Nb |
| γ | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 255 (As) is a length, measured parallel to the central longitudinal axis 101, that extends from the trailing edge 213 of the fan blade 113 to the leading edge 257 of a corresponding one of the OGVs 190. An inlet length 259 is an axial distance between the leading edge 211 of a fan blade 113 and the inlet 183. The acoustic spacing 255, chord length 210 (FIG. 2), and inlet length 259 are measured at the 75% span position of the fan blade 113.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \quad (2)$$

Nv is the number of vanes of the OGVs. In some examples, the number of OGVs (Nv) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with the acoustic spacing ratios described herein exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, to depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 259 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 259 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 259 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 259 to a nacelle outer diameter 261, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates a disk spacing length 263, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 263 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 263 to the nacelle diameter 261. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 263 to the inlet length 259. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 2

| Engine | fan-disk spacing length (in) 263 | fan diameter (in) 220 | nacelle diameter (in) 261 | inlet length (in) 259 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines with fan blades having fan diameters in the FBD #3 range. In each of the exemplary engines, the ASR is in the range of 1.5 to 16.0. ASR ranges can also be beneficially between 4.0 and 14.0, 6.6 and 13.5, or the other ranges disclosed herein.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. A relatively small amount of thrust may also be generated by an airflow exiting the working gas flowpath of the turbomachine through the exhaust section. In addition, certain turbofan engines may further include a third stream that contributes to a total thrust output of the turbofan engine, potentially allowing for a reduction in size of a core of the turbomachine for a given total turbofan engine thrust output.

Conventional turbofan engine design practice has limited a compressor pressure ratio based at least in part on the gas temperatures at the exit stage of a high pressure compressor. These relatively high temperatures at the exit of the high pressure compressor may also be avoided when they result in prohibitively high temperatures at an inlet to the turbine section, as well as when they result in prohibitively high exhaust gas temperatures through the exhaust section. For a desired turbofan engine thrust output produced from an increased pressure ratio across the high pressure compressor, there is an increase in the gas temperature at the compressor exit, at a combustor inlet, at the turbine section inlet, and through an exhaust section of the turbofan engine.

Referring to the case of an engine that utilizes cooled cooling air for operating at higher temperatures, the inventors of the present disclosure discovered, unexpectedly, that the combination of acoustic spacing and higher overall pressure ratios, achieved by reducing gas temperatures used to cool core components to accommodate higher core gas temperatures as described herein, can provide a significant benefit. The resulting turbofan engine is capable of reduced acoustic noise and higher propulsive efficiencies. These and other benefits are discussed in more detail below.

Figure 5:
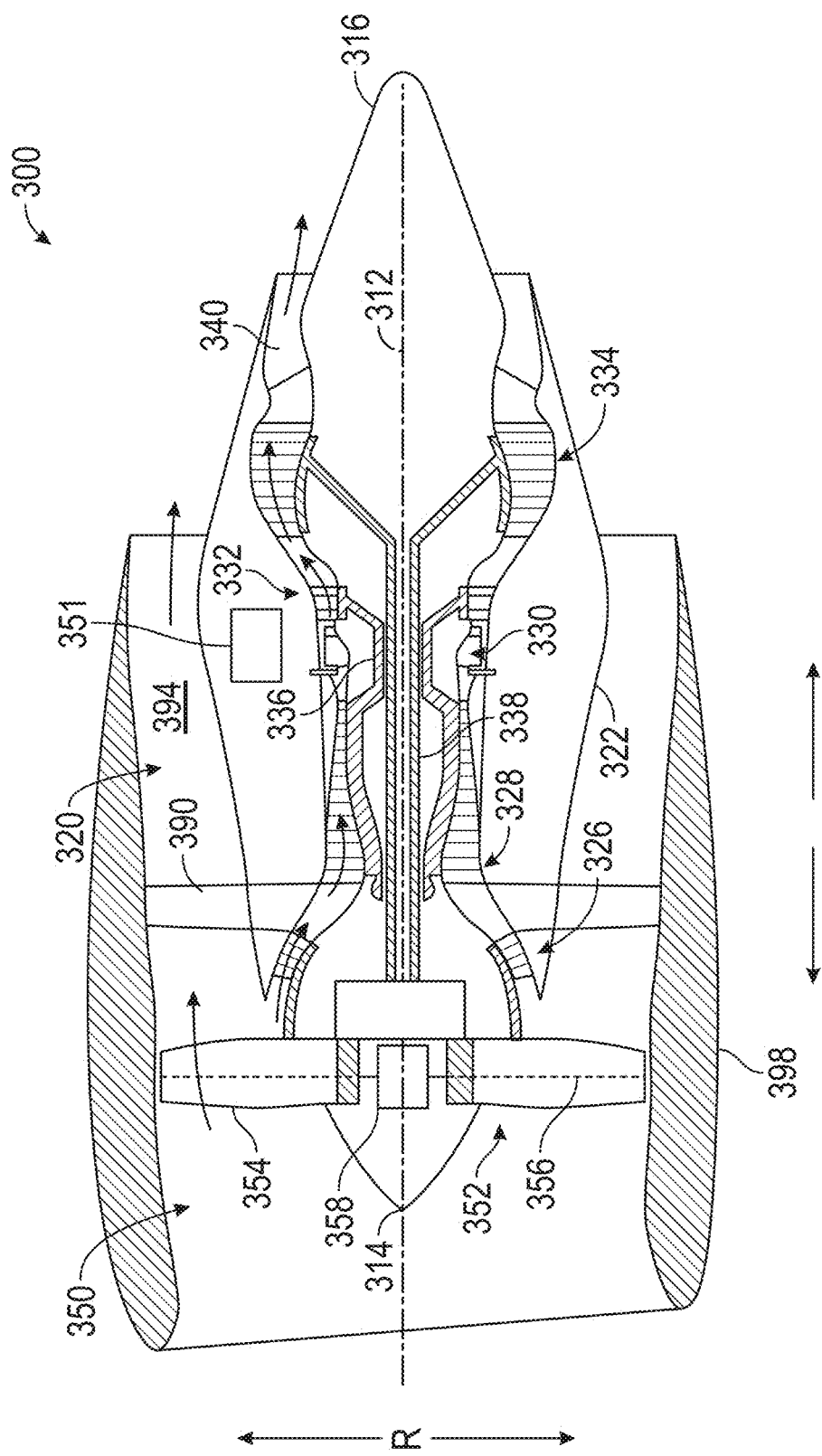
FIG. 5 is a schematic view of a ducted turbofan engine in accordance with an exemplary aspect of the present disclosure.

FIG. 5 provides a schematic view of an engine 300 in accordance with another exemplary embodiment of the present disclosure. The exemplary embodiment of FIG. 8 may be configured in substantially the same manner as the exemplary engine 100 described above.

For reference, the engine 300 defines an axial direction A, a radial direction R, and a circumferential direction C. Moreover, the engine 300 defines an axial centerline or longitudinal axis 312 that extends along the axial direction A. In general, the axial direction A extends parallel to the longitudinal axis 312, the radial direction R extends outward from and inward to the longitudinal axis 312 in a direction orthogonal to the axial direction A, and the circumferential direction extends three hundred sixty degrees (360°) around the longitudinal axis 312. The engine 300 extends between a forward end 314 and an aft end 316, e.g., along the axial direction A.

The engine 300 includes a turbomachine 320 and a rotor assembly, also referred to a fan section 350, positioned upstream thereof. Generally, the turbomachine 320 includes, in serial flow order, a compressor section, a combustion section 330, a turbine section, and an exhaust section. Particularly, as shown in FIG. 1, the turbomachine 320 includes a core cowl 322 that defines an annular core inlet. The core cowl 322 further encloses at least in part a low pressure system and a high pressure system. For example, the core cowl 322 depicted encloses and supports at least in part a booster or low pressure ("LP") compressor 326 for pressurizing the air that enters the turbomachine 320 through core inlet. A high pressure ("HP"), multi-stage, axial-flow compressor 328 receives pressurized air from the LP compressor 326 and further increases the pressure of the air. The pressurized air stream flows downstream to a combustor of the combustion section 330 where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustion section 330 downstream to a high pressure turbine 332. The high pressure turbine 332 drives the high pressure compressor 328 through a high pressure shaft 336. In this regard, the high pressure turbine 132 is drivingly coupled with the high pressure compressor 328. As will be appreciated, the high pressure compressor 328, the combustion section 330, and the high pressure turbine 332 may collectively be referred to as the "core" of the engine 100. The high energy combustion products then flow to a low pressure turbine 334. The low pressure turbine 334 drives the low pressure compressor 326 and components of the fan section 350 through a low pressure shaft 338. In this regard, the low pressure turbine 134 is drivingly coupled with the low pressure compressor 326 and components of the fan section 350. The LP shaft 338 is coaxial with the HP shaft 336 in this example embodiment. After driving each of the turbines 332, 334, the combustion products exit the turbomachine 320 through a turbomachine exhaust nozzle 340.

Accordingly, the turbomachine 320 defines a working gas flowpath or core duct that extends between the core inlet and the turbomachine exhaust nozzle 340. The working gas flowpath is an annular duct positioned generally inward of the core cowl 322 along the radial direction R.

The fan section 350 includes a fan 352. The fan 352 includes an array of fan blades 354. The fan blades 354 are rotatable, e.g., about the longitudinal axis 312. As noted above, the fan 352 is drivingly coupled with the low pressure turbine 334 via the LP shaft 338. In some embodiments, the fan 352 can be coupled with the LP shaft 338 via a speed reduction gearbox, e.g., in an indirect-drive or geared-drive configuration.

Moreover, the array of fan blades 354 can be arranged in equal spacing around the longitudinal axis 312. Each fan blade 354 has a root and a tip and a span defined therebetween, and further defines a central blade axis 356. One or more actuators 358 can be provided to facilitate rotation and may be used to change a pitch of the fan blades 354 about their respective central blades' axes 356. As discussed above, OGVs 390 couple the fan case 398 (nacelle) to the core turbine engine. The engine 300 defines a bypass passage 394 between the fan case and core cowl.

Engine 300 additionally includes a cooled cooling air system 351 configured to provide a turbine section with cooled cooling air during operation of the engine 300, to allow the engine 300 to accommodate higher temperatures to allow for a reduction in a high pressure compressor exit area, while maintaining or even increasing a maximum turbofan engine thrust output.

The exemplary engine 300 of FIG. 5 is configured as a two-stream engine, i.e., an engine without a third stream (as discussed below). With such a configuration, a total sea level static thrust output $Fn_{Total}$ of the engine 300 may generally be equal to a sum of: a fan stream thrust $Fn_{Fan}$ (i.e., an amount of thrust generated by a fan 352 through a bypass passage 394) and a turbomachine thrust $Fn_{TM}$ (i.e., an amount of thrust generated by an airflow through a turbomachine exhaust nozzle 340), each during the static, sea level, standard day conditions.

Figure 6:
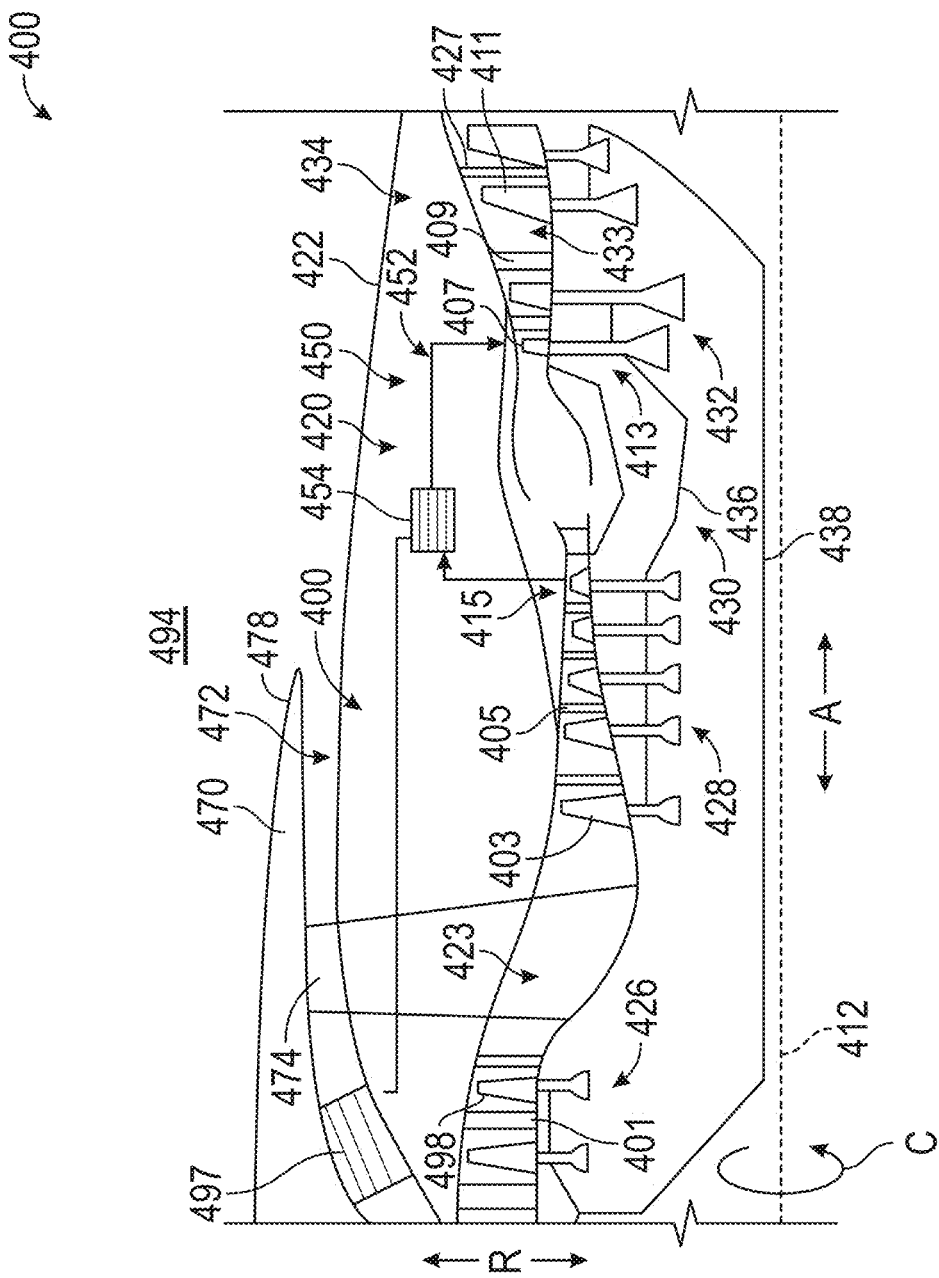
FIG. 6 is a close-up, schematic view of an exemplary three-stream engine with a cooled cooling air system.

Referring to FIG. 6, an embodiment showing a three-stream configuration is provided. FIG. 6 is a close-up, simplified, schematic view (shown without a fan case for convenience) of a portion of the engine 400 that includes a turbomachine 420 having an LP compressor 426, an HP compressor 428, a combustion section 430, an HP turbine 432, and an LP turbine 434. The LP compressor 426 includes a plurality of stages of LP compressor rotor blades 498 and a plurality of stages of LP compressor stator vanes 401 alternatingly spaced with the plurality of stages of LP compressor rotor blades 498. Similarly, the HP compressor 428 includes a plurality of stages of HP compressor rotor blades 403 and a plurality of stages of HP compressor stator vanes 405 alternatingly spaced with the plurality of stages of HP compressor rotor blades 403. Moreover, within the turbine section, the HP turbine 432 includes at least one stage of HP turbine rotor blades 407 and at least one stage of HP turbine stator vanes 409, and the LP turbine 434 includes a plurality of stages of LP turbine rotor blades 411 and a plurality of stages of LP turbine stator vanes 427 alternatingly spaced with the plurality of stages of LP turbine rotor blades 411. With reference to the HP turbine 432, the HP turbine 432 includes at least a first stage 413 of HP turbine rotor blades 407.

A fan cowl 470 annularly encases at least a portion of the core cowl 422 and is generally positioned outward of at least a portion of the core cowl 422 along the radial direction R. Particularly, a downstream section of the fan cowl 470 extends over a forward portion of the core cowl 422 to define a fan duct flowpath, or simply a fan duct 472. According to this embodiment, the fan duct flowpath or fan duct 472 may be understood as forming at least a portion of the third stream of the engine 100.

Incoming air may enter through the fan duct 472 through a fan duct inlet and may exit through a fan exhaust nozzle 478 to produce propulsive thrust. The fan duct 472 is an annular duct positioned generally outward of the working gas flowpath 423 along the radial direction R. The fan cowl 470 and the core cowl 422 are connected together and supported by a plurality of substantially radially-extending, circumferentially-spaced stationary struts 474. The stationary struts 474 may each be aerodynamically contoured to direct air flowing thereby. Other struts in addition to the stationary struts 474 may be used to connect and support the fan cowl 470 and/or core cowl 422. In many embodiments, the fan duct 472 and the working gas flowpath 423 may at least partially co-extend (generally axially) on opposite sides (e.g., opposite radial sides) of the core cowl 422. For example, the fan duct 472 and the working gas flowpath 423 may each extend directly from a leading edge of the core cowl 422 and may partially co-extend generally axially on opposite radial sides of the core cowl 422.

The engine also defines or includes an inlet duct. The inlet duct extends between an engine inlet and the core inlet/fan duct inlet. The engine inlet is defined generally at the forward end of the fan cowl 470. The inlet duct is an annular duct that is positioned inward of the fan cowl along the radial direction R. In this three-stream embodiment, air flowing downstream along the inlet duct is split, not necessarily evenly, into the working gas flowpath 423 and the fan duct 472 by the leading edge of the core cowl 422. The inlet duct is wider than the working gas flowpath 423 along the radial direction R. The inlet duct is also wider than the fan duct 472 along the radial direction R. A secondary fan is positioned at least partially in the inlet duct.

Notably, for the embodiment depicted, the engine includes one or more features to increase an efficiency of a third stream thrust, $Fn_{3S}$ (e.g., a thrust generated by an airflow through the fan duct 472 exiting through the fan exhaust nozzle 478, generated at least in part by the ducted secondary fan). In particular, the engine further includes an array of inlet guide vanes positioned in the inlet duct upstream of the ducted fan and downstream of the engine inlet. The array of inlet guide vanes are arranged around the longitudinal axis 412. One or more actuators can be provided to facilitate rotation of the inlet guide vans and therefore may be used to change a pitch of the inlet guide vanes about their respective central blade axes. However, in other embodiments, each inlet guide vane may be fixed or unable to be pitched about its central blade axis.

Further, located downstream of the ducted fan and upstream of the fan duct inlet, the engine includes an array of outlet guide vanes. As with the array of inlet guide vanes, the array of outlet guide vanes are not rotatable about the longitudinal axis 412. However, for the embodiment depicted, unlike the array of inlet guide vanes, the array of outlet guide vanes are configured as fixed-pitch outlet guide vanes.

Further, it will be appreciated that for the embodiment depicted, the fan exhaust nozzle 478 of the fan duct 472 is further configured as a variable geometry exhaust nozzle. In such a manner, the engine includes one or more actuators for modulating the variable geometry exhaust nozzle. For example, the variable geometry exhaust nozzle may be configured to vary a total cross-sectional area (e.g., an area of the nozzle in a plane perpendicular to the longitudinal axis 412) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes located upstream of the ducted fan, the array of outlet guide vanes located downstream of the ducted fan, and the fan exhaust nozzle may result in a more efficient generation of third stream thrust, $Fn_{3S}$, during one or more engine operating conditions. Further, by introducing a variability in the geometry of the inlet guide vanes and the fan exhaust nozzle, the engine may be capable of generating more efficient third stream thrust, $Fn_{3S}$, across a relatively wide array of engine operating conditions, including takeoff and climb as well as cruise.

Moreover, in exemplary embodiments, air passing through the fan duct 472 may be relatively cooler (e.g., lower temperature) than one or more fluids utilized in the turbomachine. In this way, one or more heat exchangers 497 may be positioned in thermal communication with the fan duct 472. For example, one or more heat exchangers 497 may be disposed within the fan duct 472 and utilized to cool one or more fluids from the core engine with the air passing through the fan duct 472, as a resource for removing heat from a fluid, e.g., compressor bleed air, oil or fuel.

Although not depicted, the heat exchanger 497 may be an annular heat exchanger extending substantially 360 degrees in the fan duct 472 (e.g., at least 300 degrees, such as at least 330 degrees). In such a manner, the heat exchanger 497 may effectively utilize the air passing through the fan duct 472 to cool one or more systems of the engine (e.g., a cooled cooling air system (described below), lubrication oil systems, compressor bleed air, electrical components, etc.). The heat exchanger 497 uses the air passing through duct 472 as a heat sink and correspondingly increases the temperature of the air downstream of the heat exchanger 497 and exiting the fan exhaust nozzle 478.

As will be appreciated, the engine defines a total sea level static thrust output $Fn_{Total}$, corrected to standard day conditions, which is generally equal to a maximum total engine thrust. It will be appreciated that "sea level static thrust corrected to standard day conditions" refers to an amount of thrust an engine is capable of producing while at rest relative to the earth and the surrounding air during standard day operating conditions.

The total sea level static thrust output $Fn_{Total}$ may generally be equal to a sum of: a fan stream thrust $Fn_{Fan}$ (i.e., an amount of thrust generated by the fan through the bypass passage), the third stream thrust $Fn_{3S}$ (i.e., an amount of thrust generated through the fan duct), and a turbomachine thrust $Fn_{TM}$ (i.e., an amount of thrust generated by an airflow through the turbomachine exhaust nozzle), each during the static, sea level, standard day conditions. The engine may define a total sea level static thrust output $Fn_{Total}$ greater than or equal to 15,000 pounds. For example, it will be appreciated that the engine may be configured to generate at least 25,000 pounds and less than 80,000 pounds, such as between 25,000 and 50,000 pounds, such as between 35,000 and 45,000 pounds of thrust during a takeoff operating power, corrected to standard day sea level conditions.

As will be appreciated, the engine defines a redline exhaust gas temperature (referred to herein as "EGT"), which is defined above, and for the embodiment of FIG. 6 refers to a maximum permitted takeoff temperature of an airflow after the first stator 409 downstream of the last stage of rotor blades 407 of the HP turbine 432 (at location 433 into the first of the plurality of LP turbine rotor blades 411; see FIG. 6).

Figure 7:
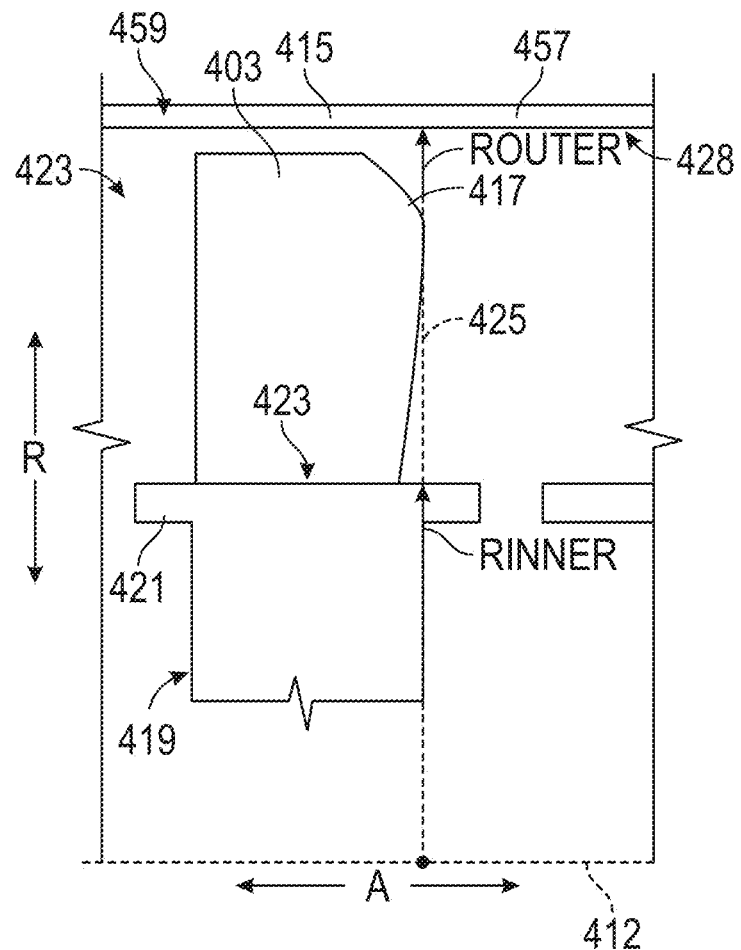
FIG. 7 is a close-up view of an aft-most stage of high pressure compressor rotor blades within the exemplary three-stream engine.

Referring particularly to the HP compressor 428, the plurality of stages of HP compressor rotor blades 403 includes an aftmost stage 415 of HP compressor rotor blades 403. Referring briefly to FIG. 7, a close-up view of an HP compressor rotor blade 403 in the aftmost stage 415 of HP compressor rotor blades 403 is provided. As will be appreciated, the HP compressor rotor blade 403 includes a trailing edge 417 and the aftmost stage 415 of HP compressor rotor blades 403 includes a rotor 419 having a base 421 to which the HP compressor rotor blade 403 is coupled. The base 421 includes a flowpath surface 423 defining in part the working gas flow path 423 through the HP compressor 428. Moreover, the HP compressor 428 includes a shroud or liner 457 located outward of the HP compressor rotor blade 403 along the radial direction R. The shroud or liner 457 also includes a flowpath surface 459 defining in part the working gas flow path 423 through the HP compressor 428.

The engine defines a reference plane 425 intersecting with an aft-most point of the trailing edge 417 of the HP compressor rotor blade 403 depicted, the reference plane 425 being orthogonal to the axial direction A. Further, the HP compressor 428 defines a high pressure compressor exit area ($A_{HPCExit}$) within the reference plane 425. More specifically, the HP compressor 428 defines an inner radius ($R_{INNER}$) extending along the radial direction R within the reference plane 425 from the longitudinal axis 412 to the flowpath surface 423 of the base 421 of the rotor 419 of the aftmost stage 415 of HP compressor rotor blades 403, as well as an outer radius ($R_{OUTER}$) extending along the radial direction R within the reference plane 425 from the longitudinal axis 412 to the flowpath surface 459 of the shroud or liner 457. The HP compressor 428 exit area is defined according to Expression (1):

$$A_{HPCExit} = \pi(R_{OUTER}^2 - R_{INNER}^2).$$  Expression (1):

For a given total thrust output ($Fn_{Total}$), a decrease in size of the high pressure compressor exit area ($A_{HPCExit}$) may generally relate in an increase in a compressor exit temperature (i.e., a temperature of the airflow through the working gas flowpath 423 at the reference plane 425), a turbine inlet temperature (i.e., a temperature of the airflow through the working gas flowpath 423 provided to the first stage 413 of HP turbine rotor blades 407; see FIG. 6), and the redline exhaust gas temperature (EGT). In particular, the high pressure compressor exit area ($A_{HPCExit}$) may generally be used as an indicator of the above temperatures to be achieved by the engine 400 during operation for a given total thrust output ($Fn_{Total}$) of the engine 400.

Referring back to FIG. 6, the exemplary engine 400 depicted includes one or more technologies to accommodate the relatively small high pressure compressor exit area ($A_{HPCExit}$) for the total thrust output ($Fn_{Total}$) of the engine 400. In particular, for the embodiment depicted, the exemplary engine 400 includes a cooled cooling air system 450. The exemplary cooled cooling air system 450 is in fluid communication with the HP compressor 428 and the first stage 413 of HP turbine rotor blades 407. More specifically, for the embodiment depicted, the cooled cooling air system 450 includes a duct assembly 452 and a cooled cooling air (CCA) heat exchanger 454. The duct assembly 452 is in fluid communication with the HP compressor 428 for receiving an airflow from the HP compressor 428 and providing such airflow to the first stage 413 of HP turbine rotor blades 407 during operation of the engine 400. The CCA heat exchanger 454 is in thermal communication with the airflow through the duct assembly 452 for reducing a temperature of the airflow through the duct assembly 452 upstream of the first stage 413 of HP turbine rotor blades 407.

The engine 400 depicted further includes a thermal transport bus 499, with the CCA heat exchanger 454 of the cooled cooling air system 450 in thermal communication with, or integrated into, the thermal transport bus 499. For the embodiment depicted, the engine 400 further includes the heat exchanger 497 in the fan duct 472 in thermal communication with, or integrated into, the thermal transport bus 499, such that heat from the CCA heat exchanger 454 of the cooled cooling air system 450 may be transferred to the heat exchanger 497 in the fan duct 472 using the thermal transport bus 499.

Figure 8:
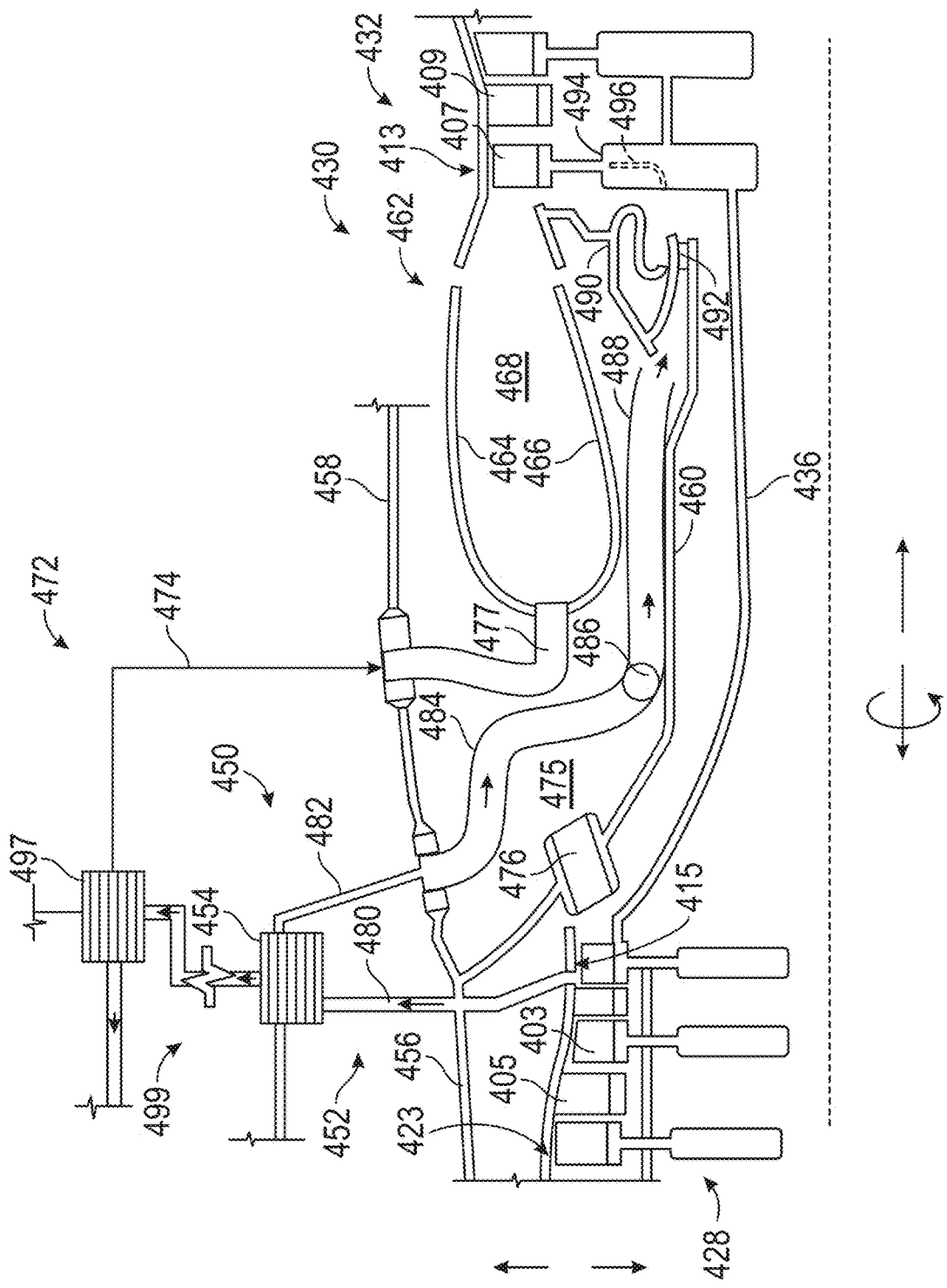
FIG. 8 is a close-up, schematic view of the exemplary three-stream engine showing a cooled cooling air system.

Referring now to FIG. 8, a close-up, schematic view of the turbomachine of the engine 400 of FIG. 2, including the cooled cooling air system 450, is provided.

As is shown, the turbine section includes a compressor casing 456, and the combustion section 430 of the turbomachine generally includes an outer combustor casing 458, an inner combustor casing 460, and a combustor 462. The combustor 462 generally includes an outer combustion chamber liner 464 and an inner combustion chamber liner 466, together defining at least in part a combustion chamber 468. The combustor 462 further includes a fuel nozzle 477 configured to provide a mixture of fuel and air to the combustion chamber 468 to generate combustion gases.

The engine further includes a fuel delivery system 472 including at least a fuel line 474 in fluid communication with the fuel nozzle 477 for providing fuel to the fuel nozzle 477.

The turbomachine includes a diffuser nozzle 476 located downstream of the aftmost stage 415 of HP compressor rotor blades 403 of the HP compressor 428, within the working gas flowpath 423. In the embodiment depicted, the diffuser nozzle 476 is coupled to, or integrated with the inner combustor casing 460, the outer combustor casing 458, or both. The diffuser nozzle 476 is configured to receive compressed airflow from the HP compressor 428 and straighten such compressed air prior to such compressed air being provided to the combustion section 430. The combustion section 430 defines a diffusion cavity 475 downstream of the diffuser nozzle 476 and upstream of the combustion chamber 468.

As noted above, the exemplary engine further includes the cooled cooling air system 450. The cooled cooling air system 450 includes the duct assembly 452 and the CCA heat exchanger 454. More specifically, the duct assembly 452 includes a first duct 480 in fluid communication with the HP compressor 428 and the CCA heat exchanger 454. The first duct 480 more specifically extends from the HP compressor 428, through the compressor casing 456, to the CCA heat exchanger 454. For the embodiment depicted, the first duct 480 is in fluid communication with the HP compressor 428 at a location in between the last two stages of HP compressor rotor blades 403. In such a manner, the first duct 480 is configured to receive a cooling airflow from the HP compressor 428 and to provide the cooling airflow to the CCA heat exchanger 454.

It will be appreciated, however, that in other embodiments, the first duct 480 may additionally or alternatively be in fluid communication with the HP compressor 428 at any other suitable location, such as at any other location closer to a downstream end of the HP compressor 428 than an upstream end of the HP compressor 128, or alternatively at a location closer to the upstream end of the HP compressor 428 than the downstream end of the HP compressor 428.

The duct assembly 452 further includes a second duct 482 extending from the CCA heat exchanger 454 to the outer combustor casing 458 and a third duct 484 extending from the outer combustor casing 458 inwardly generally along the radial direction R. The CCA heat exchanger 454 may be configured to receive the cooling airflow and to extract heat from the cooling airflow to reduce a temperature of the cooling airflow. The second duct 482 may be configured to receive cooling airflow from the CCA heat exchanger 454 and provide the cooling airflow to the third duct 484. The third duct 484 extends through the diffusion cavity generally along the radial direction R.

Moreover, for the embodiment depicted, the duct assembly 452 further includes a manifold 486 in fluid communication with the third duct 484 and a fourth duct 488. The manifold 486 extends generally along the circumferential direction C of the engine, and the fourth duct 488 is more specifically a plurality of fourth ducts 488 extending from the manifold 486 at various locations along the circumferential direction C forward generally along the axial direction A towards the turbine section. In such a manner, the duct assembly 452 of the cooled cooling air system 450 may be configured to provide cooling airflow to the turbine section at a variety of locations along the circumferential direction C.

Notably, referring still to FIG. 8, the combustion section 430 includes an inner stator assembly 490 located at a downstream end of the inner combustion chamber liner 466, and coupled to the inner combustor casing 460. The inner stator assembly 490 includes a nozzle 492. The fourth duct 488, or rather, the plurality of fourth ducts 488, are configured to provide the cooling airflow to the nozzle 492. The nozzle 492 may include a plurality of vanes spaced along the circumferential direction C configured to impart a circumferential swirl to the cooling airflow provided through the plurality of fourth ducts 488 to assist with such airflow being provided to the first stage 413 of HP turbine rotor blades 407.

In particular, for the embodiment depicted, the HP turbine 432 further includes a first stage HP turbine rotor 494, with the plurality of HP turbine rotor blades 407 of the first stage 413 coupled to the first stage HP turbine rotor 494. The first stage HP turbine rotor 494 defines an internal cavity 496 configured to receive the cooling airflow from the nozzle 492 and provide the cooling airflow to the plurality of HP turbine rotor blades 407 of the first stage 413. In such a manner, the cooled cooling air system 450 may provide cooling airflow to the HP turbine rotor blades 407 to reduce a temperature of the plurality HP turbine rotor blades 407 at the first stage 413 during operation of the engine.

For example, in certain exemplary aspects, the cooled cooling air system 450 may be configured to provide a temperature reduction of the cooling airflow equal to at least 15% of the EGT and up to 45% of the EGT. Further, in certain exemplary aspects, the cooled cooling air system 450 may be configured to receive between 2.5% and 35% of an airflow through the working gas flowpath 423 at an inlet to the HP compressor 428, such as between 3% and 20%, such as between 4% and 15%.

In addition, as briefly mentioned above, the cooled cooling air system 450 may utilize the thermal transport bus 499 to reject heat from the cooling air extracted from the compressor section of the turbomachine. In particular, for the embodiment shown the CCA heat exchanger 454 is in thermal communication with or integrated into the thermal transport bus 499. Notably, the thermal transport bus 499 further includes a fuel heat exchanger 497 in thermal communication with the fuel line 474. In such a manner, the thermal transport bus 499 may extract heat from the cooling air extracted from the compressor section through the cooled cooling air system 450 and provide such heat to a fuel flow through the fuel line 474 upstream of the fuel nozzle 477.

For the embodiment depicted, the thermal transport bus 499 includes a conduit having a flow of thermal transport fluid therethrough. More specifically, referring now briefly to FIG. 9, a schematic view of a thermal transport bus 499 as may be utilized with the exemplary engines described herein provided.

The thermal transport bus 499 includes an intermediary heat exchange fluid flowing therethrough and is formed of one or more suitable fluid conduits 404. The heat exchange fluid may be an incompressible fluid having a high temperature operating range. Additionally, or alternatively, the heat exchange fluid may be a single phase fluid, or alternatively, may be a phase change fluid. In certain exemplary embodiments, the heat exchange fluid may be a supercritical fluid, such as a supercritical $CO_2$.

The exemplary thermal transport bus 499 includes a pump 406 in fluid communication with the heat exchange fluid in the thermal transport bus 499 for generating a flow of the heat exchange fluid in/through the thermal transport bus 499.

Moreover, the exemplary thermal transport bus 499 includes one or more heat source exchangers 408 in thermal communication with the heat exchange fluid in the thermal transport bus 499. Specifically, the thermal transport bus 499 depicted includes a plurality of heat source exchangers 408. The plurality of heat source exchangers 408 are configured to transfer heat from one or more of the accessory systems of an engine within which the thermal transport bus 499 is installed to the heat exchange fluid in the thermal transport bus 499. For example, in certain exemplary embodiments, the plurality of heat source exchangers 408 may include one or more of: a CCA heat source exchanger (such as CCA heat exchanger 454); a main lubrication system heat source exchanger for transferring heat from a main lubrication system; an advanced clearance control (ACC) system heat source exchanger for transferring heat from an ACC system; a generator lubrication system heat source exchanger for transferring heat from the generator lubrication system; an environmental control system (ECS) heat exchanger for transferring heat from an ECS; an electronics cooling system heat exchanger for transferring heat from the electronics cooling system; a vapor compression system heat source exchanger; an air cycle system heat source exchanger; and an auxiliary system(s) heat source exchanger.

For the embodiment depicted, there are three heat source exchangers 408. The heat source exchangers 408 are each arranged in series flow along the thermal transport bus 499. However, in other exemplary embodiments, any other suitable number of heat source exchangers 408 may be included and one or more of the heat source exchangers 408 may be arranged in parallel flow along the thermal transport bus 499 (in addition to, or in the alternative to the serial flow arrangement depicted). For example, in other embodiments there may be a single heat source exchanger 408 in thermal communication with the heat exchange fluid in the thermal transport bus 499, or alternatively, there may be at least two heat source exchangers 408, at least four heat source exchangers 408, at least five heat source exchangers 408, or at least six heat source exchangers 408, and up to twenty heat source exchangers 408 in thermal communication with heat exchange fluid in the thermal transport bus 499.

Figure 9:
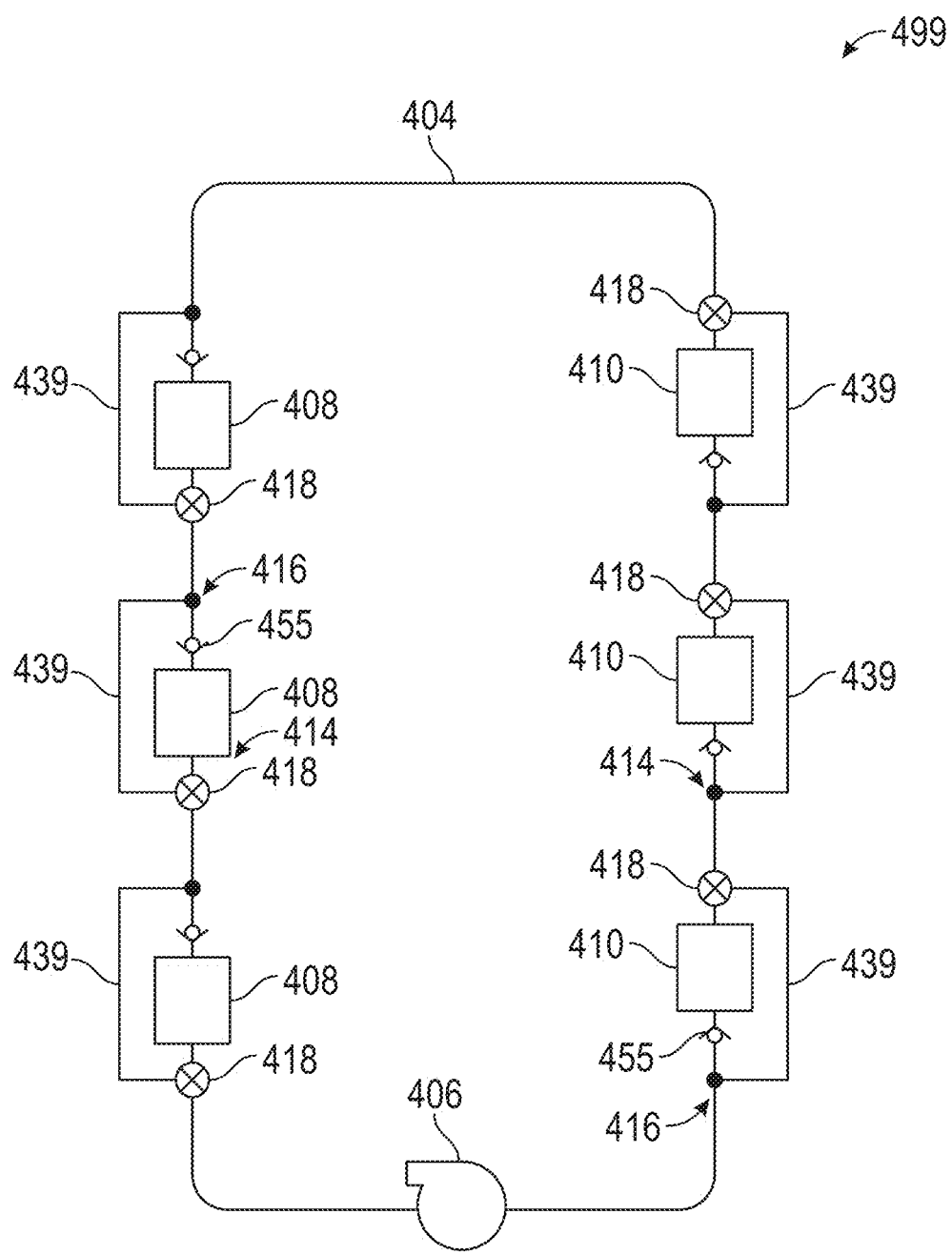
FIG. 9 is a schematic view of a thermal transport bus of the present disclosure.

Additionally, the exemplary thermal transport bus 499 of FIG. 9 further includes one or more heat sink exchangers 410 permanently or selectively in thermal communication with the heat exchange fluid in the thermal transport bus 499. The one or more heat sink exchangers 410 are located downstream of the plurality of heat source exchangers 408 and are configured for transferring heat from the heat exchange fluid in the thermal transport bus 499, e.g., to atmosphere, to fuel, to a fan stream, etc. For example, in certain embodiments the one or more heat sink exchangers 410 may include at least one of a RAM heat sink exchanger, a fuel heat sink exchanger, a fan stream heat sink exchanger, a bleed air heat sink exchanger, an engine intercooler heat sink exchanger, a bypass passage heat sink exchanger, or a cold air output heat sink exchanger of an air cycle system. The fuel heat sink exchanger is a "fluid to heat exchange fluid" heat exchanger wherein heat from the heat exchange fluid is transferred to a stream of liquid fuel (see, e.g., fuel heat exchanger 497 of the engine of FIG. 8). Moreover, the fan stream heat sink exchanger is generally an "air to heat exchange fluid" heat exchanger which transfers heat from the heat exchange fluid to an airflow through the fan stream (see, e.g., heat exchanger 497 of FIG. 6). Further, the bleed air heat sink exchanger is generally an "air to heat exchange fluid" heat exchanger which flows, e.g., bleed air from the LP compressor 426 over the heat exchange fluid to remove heat from the heat exchange fluid.

For the embodiment of FIG. 9, the one or more heat sink exchangers 410 of the thermal transport bus 499 depicted includes a plurality of individual heat sink exchangers 410. More particularly, for the embodiment of FIG. 9, the one or more heat sink exchangers 410 include three heat sink exchangers 410 arranged in series. The three heat sink exchangers 410 are configured as a bypass passage heat sink exchanger, a fuel heat sink exchanger, and a fan stream heat sink exchanger. However, in other exemplary embodiments, the one or more heat sink exchangers 410 may include any other suitable number and/or type of heat sink exchangers 410. For example, in other exemplary embodiments, a single heat sink exchanger 410 may be provided, at least two heat sink exchangers 410 may be provided, at least four heat sink exchangers 410 may be provided, at least five heat sink exchangers 410 may be provided, or up to twenty heat sink exchangers 410 may be provided. Additionally, in still other exemplary embodiments, two or more of the one or more heat sink exchangers 410 may alternatively be arranged in parallel flow with one another.

Referring still to the exemplary embodiment depicted in FIG. 9, one or more of the plurality of heat sink exchangers 410 and one or more of the plurality of heat source exchangers 408 are selectively in thermal communication with the heat exchange fluid in the thermal transport bus 499. More particularly, the thermal transport bus 499 depicted includes a plurality of bypass lines 439 for selectively bypassing each heat source exchanger 408 and each heat sink exchanger 410 in the plurality of heat sink exchangers 410. Each bypass line 439 extends between an upstream juncture 414 and a downstream juncture 416—the upstream juncture 414 located just upstream of a respective heat source exchanger 408 or heat sink exchanger 410, and the downstream juncture 416 located just downstream of the respective heat source exchanger 408 or heat sink exchanger 410.

Additionally, each bypass line 439 meets at the respective upstream juncture 414 with the thermal transport bus 499 via a three-way valve 418. The three-way valves 418 each include an inlet fluidly connected with the thermal transport bus 499, a first outlet fluidly connected with the thermal transport bus 499, and a second outlet fluidly connected with the bypass line 439. The three-way valves 418 may each be a variable throughput three-way valve, such that the three-way valves 418 may vary a throughput from the inlet to the first and/or second outlets. For example, the three-way valves 418 may be configured for providing anywhere between zero percent (0%) and one hundred percent (100%) of the heat exchange fluid from the inlet to the first outlet, and similarly, the three-way valves 418 may be configured for providing anywhere between zero percent (0%) and one hundred percent (100%) of the heat exchange fluid from the inlet to the second outlet.

Notably, the three-way valves 418 may be in operable communication with a controller of an engine including the thermal transport bus 499.

Further, each bypass line 439 also meets at the respective downstream juncture 416 with the thermal transport bus 499. Between each heat source exchanger 408 or heat sink exchanger 410 and downstream juncture 416, the thermal transport bus 499 includes a check valve 455 for ensuring a proper flow direction of the heat exchange fluid. More particularly, the check valve 455 prevents a flow of heat exchange fluid from the downstream juncture 416 towards the respective heat source exchanger 408 or heat sink exchanger 410.

A significant relationship was determined to exist between a total sea level static thrust output, a compressor exit area, and a redline exhaust gas temperature that enables increased engine core operating temperatures and overall engine propulsive efficiency. The relationship can be thought of as an indicator of the ability of a turbofan engine to have a reduced weight or volume as represented by a high pressure compressor exit area, while maintaining or even improving upon an overall thrust output, and without overly detrimentally affecting overall engine performance and other qualitative turbofan engine characteristics. The relationship applies to an engine that incorporates a cooled cooling air system, builds portions of the core using material capable of operating at higher temperatures, or a combination of the two. Significantly, the relationship ties the core size (as represented by the exit area of the higher pressure compressor) to the desired thrust and exhaust gas temperature associated with the desired propulsive efficiency and practical limitations of the engine design, as described below.

Referring to the case of an engine that utilizes cooled cooling air for operating at higher temperatures, the inventors discovered, unexpectedly, that the costs associated with achieving a higher compression, enabled by reducing gas temperatures used to cool core components to accommodate higher core gas temperatures, may indeed produce a net benefit, contrary to expectations in the art. Referring to the case of utilizing more temperature-resistant material, such as a Carbon Matrix Composite (CMC), it was found that certain aspects of the engine size, weight and operating characteristics can be positively affected while taking into account the complexities and/or drawbacks associated with such material. In either case, the relationship now described can apply to identify the interrelated operating conditions and core size—i.e., total sea level static thrust, redline exhaust gas temperature, and compressor exit area, respectively.

Bounding the relationship between a product of total thrust output and redline exhaust gas temperature at a takeoff power level and the high pressure compressor exit area squared (corrected specific thrust), as described herein, can result in a higher power density core. This bounded relationship, as described herein, takes into due account the amount of overall complexity and cost, and/or a low amount of reliability associated with implementing the technologies required to achieve the operating temperatures and exhaust gas temperature associated with the desired thrust levels. The amount of overall complexity and cost may be prohibitively high for gas turbine engines outside the bounds of the relationship as described herein, and/or the reliability may be prohibitively low outside the bounds of the relationship as described herein. The relationship discovered, infra, can therefore identify an improved engine configuration suited for a particular mission requirement, one that takes into account efficiency, weight, cost, complexity, reliability, and other factors influencing the optimal choice for an engine configuration.

The desired relationship providing for the improved gas turbine engine is expressed as:

$$CST = Fn_{Total} \times EGT / (A_{HPCExit}^2 \times 1000), \quad \text{Expression (2):}$$

where CST is corrected specific thrust; $Fn_{Total}$ is a total sea level static thrust output of the gas turbine engine in pounds;

EGT is redline exhaust gas temperature in degrees Celsius; and $A_{HPCExit}$ is a high pressure compressor exit area in square inches.

CST values of an engine defined by Expression (2) in accordance with various embodiments of the present disclosure are from 42 to 90, such as from 45 to 80, such as from 50 to 80. The units of the CST values may be pounds-degrees Celsius over square inches.

Figures 10, 11:
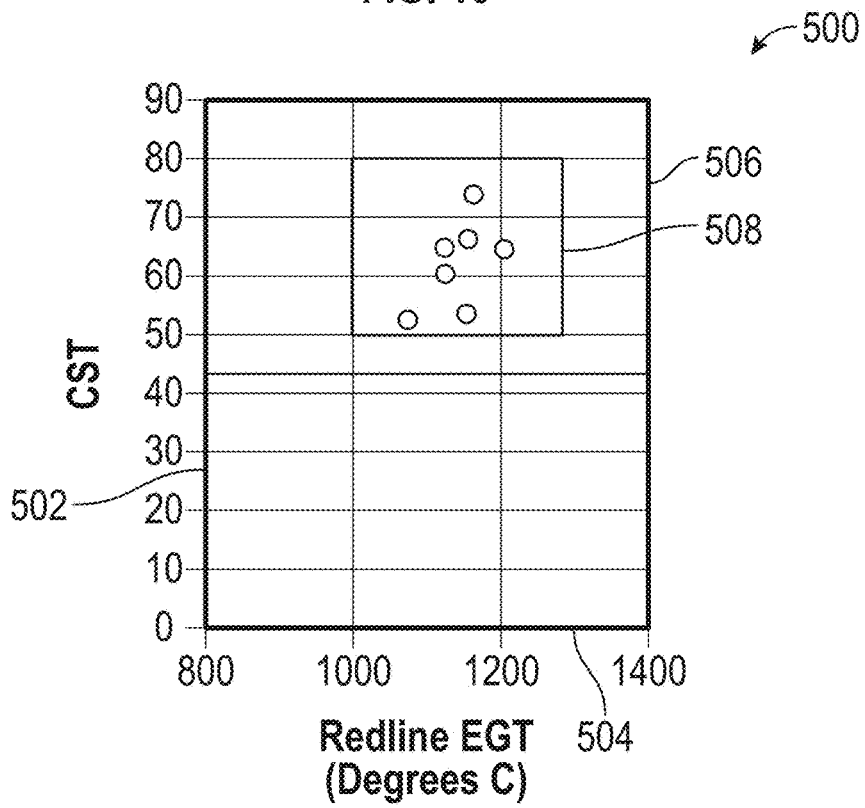
FIG. 10 is a table depicting numerical values showing the relationships between various parameters in accordance with various example embodiments of the present disclosure.
FIG. 11 is a graph depicting a range of corrected specific thrust values and redline exhaust gas temperature values of gas turbine engines in accordance with various example embodiments of the present disclosure.

Referring now to FIGS. 10 and 11, various exemplary gas turbine engines are illustrated in accordance with one or more exemplary embodiments of the present disclosure. In particular, FIG. 10 provides a table including numerical values corresponding to several of the plotted gas turbine engines in FIG. 11. FIG. 11 is a plot 500 of gas turbine engines in accordance with one or more exemplary embodiments of the present disclosure, showing the CST on a Y-axis 502 and the EGT on an X-axis 504.

As shown, the plot 500 in FIG. 11 depicts a first range 506, with the CST values between 42 and 90 and EGT values from 800 degrees Celsius to 1400 degrees Celsius. FIG. 7 additionally depicts a second range 508, with the CST values between 50 and 80 and EGT values from 1000 degrees Celsius to 1300 degrees Celsius. It will be appreciated that in other embodiments, the EGT value may be greater than 1100 degree Celsius and less than 1250 degrees Celsius, such as greater than 1150 degree Celsius and less than 1250 degrees Celsius, such as greater than 1000 degree Celsius and less than 1300 degrees Celsius.

The combination of acoustic spacing, as described above, and corrected specific thrust (CST) in gas turbine engines offers several advantages, particularly when operating at higher temperatures with cooled cooling air systems. Corrected specific thrust (CST) is a measure of the engine's efficiency in converting fuel energy into thrust. By optimizing acoustic spacing, the engine can maintain or even improve its propulsive efficiency. This is achieved by reducing aerodynamic losses and improving the flow of air through the engine, which in turn enhances the overall performance.

In addition, the use of cooled cooling air allows the engine to operate at higher temperatures without compromising the integrity of core components. This is particularly beneficial for achieving higher compression ratios, which can lead to increased thrust output. The combination of acoustic spacing and the thrust efficiencies described herein ensure that these higher temperatures do not result in excessive noise or reduced efficiency.

The higher compression ratios for the gas turbine engines described herein are associated with increased pressure and temperature levels within the engine's core, which can contribute to additional noise generation through increased turbulence and vibrational noise. The acoustic spacing of fan blades and outlet guide vanes (OGVs), as described herein, are intended to mitigate the additional noise generation that can result from the higher overall pressure ratio and operating temperatures, but without adversely affecting the aero-mechanics in the fan. By operating within the bounds defined herein for ASR, ITN and/or BEAL (as described herein), and the range of fan solidity, number of fan blades disclosed herein, the engine can achieve the desired increased thrust output without a loss in aero-efficiency of the fan that may have otherwise resulted when meeting a design maximum noise level. This ensures that the engine operates efficiently and complies with all required noise regulations, providing the desired increased performance but without negatively impacting fan efficiently while improving fan noise levels.

A high speed LPT proximal to the core nozzle exhaust is an additional noise source that will add pressure to the aggregate noise of the overall engine. The engine's noise signature is an amalgamation of fan noise, fan nozzle jet velocity, LPT blade passing, core nozzle exit velocity. That noise is likely to go up overall given the high speed LPT, so mitigating the remaining noise sources is very important without detracting from fan efficiency through the bypass and into the core, thus reinforcing the benefits of adopting the desired ranges for BEAL and ASR. By reducing noise and improving thrust efficiency, the engine can also achieve better fuel consumption rates. This is particularly important for commercial aircraft, where fuel costs represent a significant portion of operating expenses. The combination of acoustic spacing and the thrust efficiencies described herein can improve both performance and fuel efficiency.

It will be appreciated that in other exemplary embodiments of the present disclosure, the cooled cooling air system 450 may be configured in any other suitable manner. For example, the exemplary cooled cooling air system 450 described above is generally configured as a thermal bus cooled cooling air system. However, in other embodiments, the cooled cooling air system 450 may instead be a dedicated heat exchanger cooled cooling air system (i.e., a cooled cooling air system including a heat exchanger that transfers heat directly to a cooling medium). Additionally, in other embodiments, the cooled cooling air system 450 may be a bypass heat exchanger cooled cooling air system having a heat sink heat exchanger thermally coupled to an airflow through a bypass passage (see, e.g., FIG. 12, discussed below). Additionally, or alternatively, in other embodiments, the cooled cooling air system 450 may be one of an air-to-air cooled cooling air system (a cooled cooling air system having a heat sink heat exchanger configured to transfer heat to an airflow; see, e.g., FIG. 12, discussed below); an oil-to-air cooled cooling air system (a cooled cooling air system having a heat sink heat exchanger configured to transfer heat to an oil flow); or a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 8).

Figure 12:
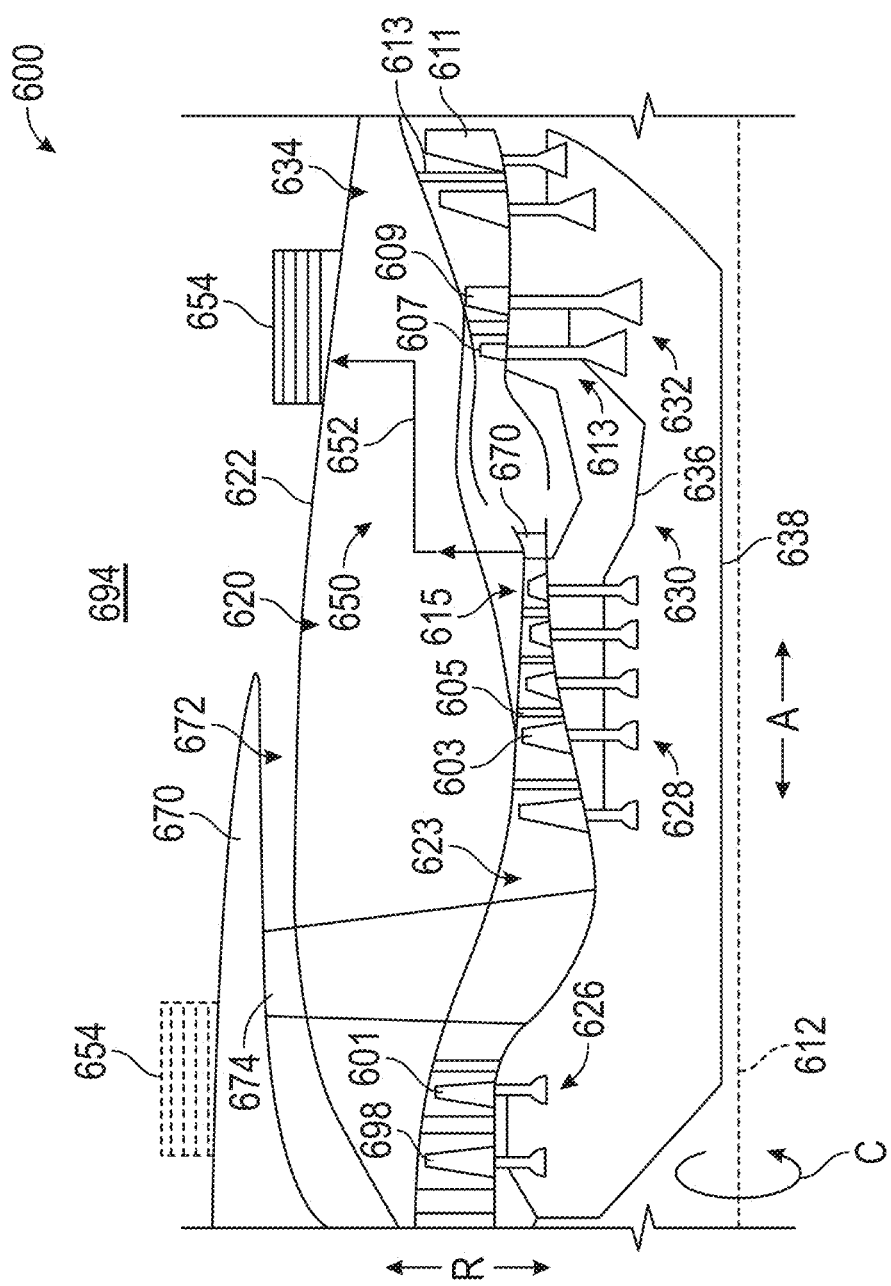
FIG. 12 is a schematic, close-up view of a gas turbine engine having a cooled cooling air system in accordance with another exemplary aspect of the present disclosure.
Figure 13:
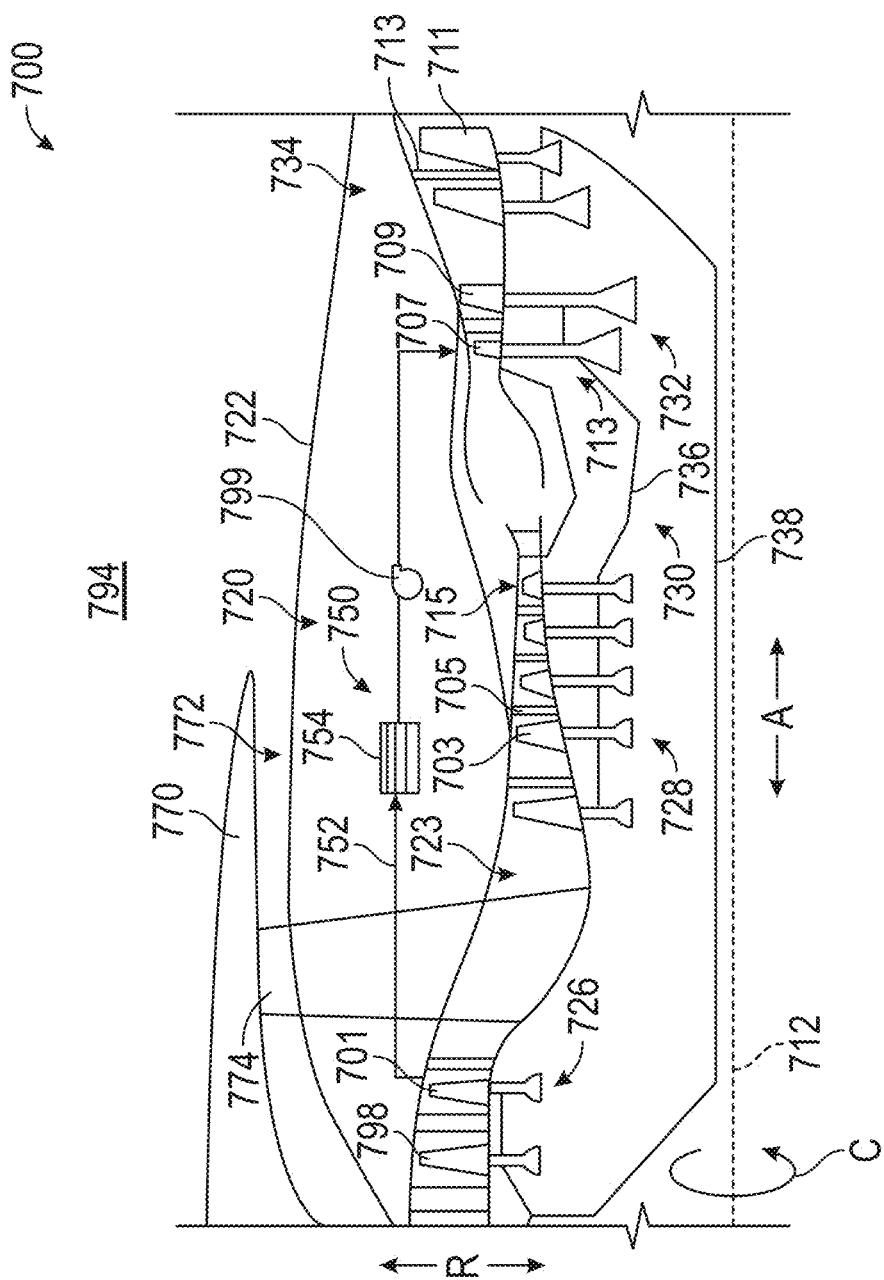
FIG. 13 is a schematic, close-up view of a gas turbine engine having a cooled cooling air system in accordance with yet another exemplary aspect of the present disclosure.
Figure 14:
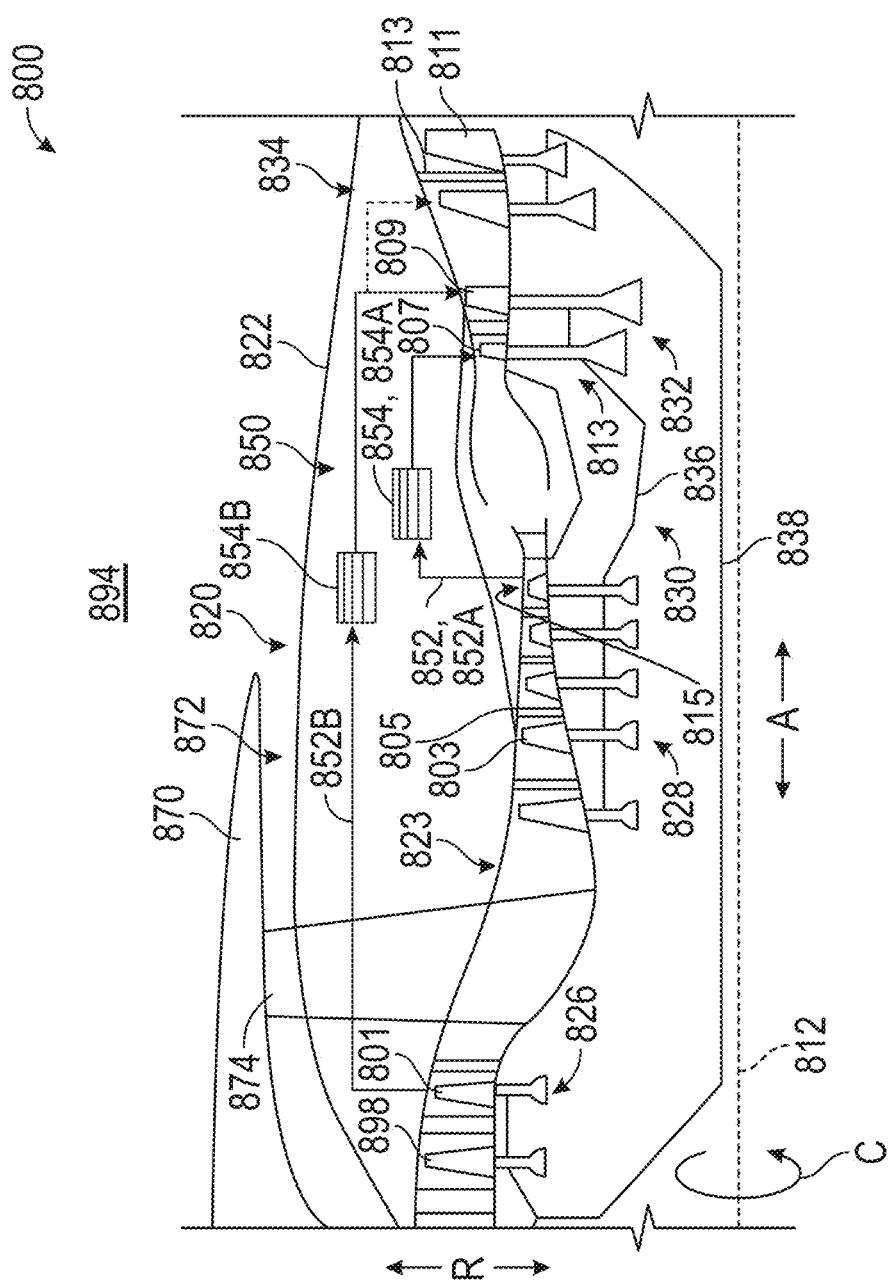
FIG. 14 is a schematic, close-up view of a gas turbine engine having a cooled cooling air system in accordance with still another exemplary aspect of the present disclosure.

More particularly, referring generally to FIGS. 12 through 14, in other exemplary embodiments, the cooled cooling air system may be configured in any other suitable manner. The exemplary engines depicted in FIGS. 12 through 14 may be configured in a similar manner as exemplary engine described above, and the same or similar numbers may refer to the same or similar parts.

For example, each of the exemplary engines depicted in FIGS. 12 through 14 generally includes a turbomachine having an LP compressor, an HP compressor, a combustion section, an HP turbine, and an LP turbine collectively defining at least in part a working gas flowpath and arranged in serial flow order. The exemplary turbomachine depicted additionally includes a core cowl, and the engine includes a fan cowl. The engine includes or defines a fan duct positioned partially between the core cowl and the fan cowl. Moreover, a bypass passage is defined at least in part by the core cowl, the fan cowl, or both and extends over the turbomachine.

Moreover, the exemplary engines 600, 700, 800 depicted in FIGS. 12 to 14 additionally include a cooled cooling air system 650, 750, 850. The cooled cooling air system generally includes a duct assembly 652, 752, 852 and a CCA heat exchanger 654, 754, 854.

However, referring particular to FIG. 12, it will be appreciated that for the exemplary embodiment depicted, the CCA heat exchanger 654 is positioned in thermal communication with the bypass passage 694, and more specifically, it is exposed to an airflow through or over the bypass passage 694. For the embodiment of FIG. 12, the CCA heat exchanger 654 is positioned on the core cowl 622. In such a manner, the CCA heat exchanger 654 may be an air-to-air CCA heat exchanger configured to exchange heat between an airflow extracted from the HP compressor 628 and the airflow through the bypass passage 694.

As is depicted in phantom, the cooled cooling air system 650 may additionally or alternatively be positioned at any other suitable location along the bypass passage 694, such as on the fan cowl 670. Further, although depicted in FIG. 12 as being positioned on the core cowl 622, in other embodiments, the CCA heat exchanger 654 may be embedded into the core cowl 622, and airflow through the bypass passage 694 may be redirected from the bypass passage 694 to the CCA heat exchanger 654.

As will be appreciated, a size of the CCA heat exchanger 654 may affect the amount of drag generated by the CCA heat exchanger 654 being positioned within or exposed to the bypass passage 694. Accordingly, sizing the cooled cooling air system 650 in accordance with the present disclosure may allow for a desired reduction in a HP compressor 628 exit area, while maintaining or even increasing a total thrust output for the engine, without creating an excess amount of drag on the engine in the process.

Referring now particular to FIG. 13, it will be appreciated that for the exemplary embodiment depicted, the cooled cooling air system 750 is configured to receive the cooling airflow from an air source upstream of a downstream half of the HP compressor 728. In particular, for the exemplary embodiment of FIG. 13, the exemplary cooled cooling air system 750 is configured to receive the cooling airflow from a location upstream of the HP compressor 728, and more specifically, still, from the LP compressor 726. In order to allow for a relatively low pressure cooling airflow to be provided to a first stage 713 of HP turbine rotor blades 707 of the HP turbine 732, the cooled cooling air system 750 further includes a pump 799 in airflow communication with the duct assembly 752 to increase a pressure of the cooling airflow through the duct assembly 752. For the exemplary aspect depicted, the pump 799 is positioned downstream of the CCA heat exchanger 754. In such a manner, the pump 799 may be configured to increase the pressure of the cooling airflow through the duct assembly 752 after the cooling airflow has been reduced in temperature by the CCA heat exchanger 754. Such may allow for a reduction in wear on the pump 799.

Referring now particularly to FIG. 14, it will be appreciated that the cooled cooling air system 850 includes a high-pressure portion and a low-pressure portion operable in parallel. In particular, the duct assembly 852 includes a high-pressure duct assembly 852A and a low-pressure duct assembly 852B, and the CCA heat exchanger 854 includes a high-pressure CCA heat exchanger 854A and a low-pressure CCA heat exchanger 854B.

The high-pressure duct assembly 852A is in fluid communication with the HP compressor 828 at a downstream half of the high-pressure compressor and is further in fluid communication with a first stage 813 of HP turbine rotor blades 807. The high-pressure duct assembly 852A may be configured to receive a high-pressure cooling airflow from the HP compressor 828 through the high-pressure duct assembly 852A and provide such high-pressure cooling airflow to the first stage 813 of HP turbine rotor blades 807. The high-pressure CCA heat exchanger 854A may be configured to reduce a temperature of the high-pressure cooling airflow through the high-pressure duct assembly 852A at a location upstream of the first stage 813 of HP turbine rotor blades 807.

The low-pressure duct assembly 852B is in fluid communication with a location upstream of the downstream half of the high-pressure compressor 828 and is further in fluid communication with the HP turbine 832 and a location downstream of the first stage 813 of HP turbine rotor blades 807. In particular, for the embodiment depicted, the low-pressure duct assembly 852B is in fluid communication with the LP compressor 826 and a second stage (not labeled) of HP turbine rotor blades 807. The low-pressure duct assembly 852B may be configured to receive a low-pressure cooling airflow from the LP compressor 826 through the low-pressure duct assembly 852B and provide such low-pressure cooling airflow to the second stage of HP turbine rotor blades 807. The low-pressure CCA heat exchanger 854B may be configured to reduce a temperature of the low-pressure cooling airflow through the low-pressure duct assembly 852B upstream of the second stage of HP turbine rotor blades 807.

Inclusion of the exemplary cooled cooling air system 850 of FIG. 14 may reduce an amount of resources utilized by the cooled cooling air system 850 to provide a desired amount of cooling for the turbomachine.

Further, for the exemplary embodiment of FIG. 14, it will be appreciated that the cooled cooling air system 850 may further be configured to provide cooling to one or more stages of LP turbine rotor blades 811, and in particular to a first stage (i.e., upstream-most stage) of LP turbine rotor blades 811. Such may further allow for, e.g., the higher operating temperatures described herein.

Figure 15:
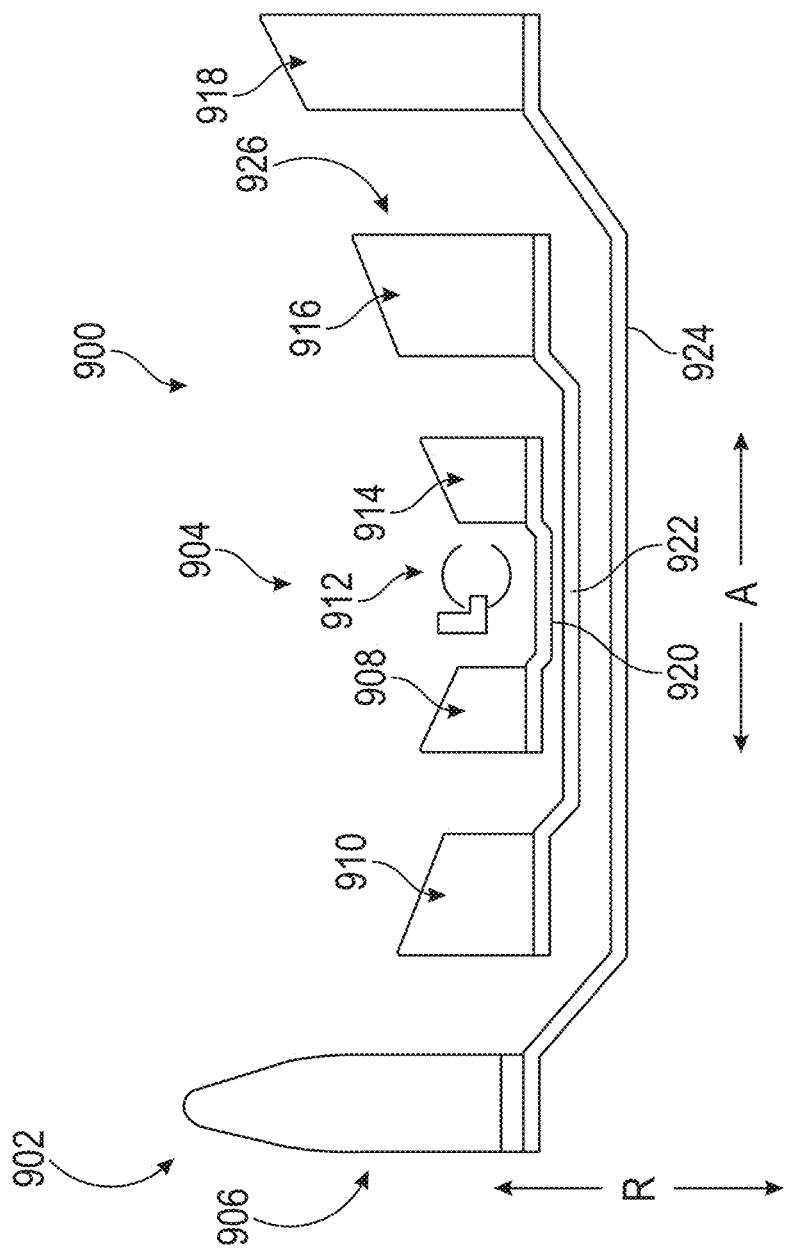
FIG. 15 is a schematic view of a turbofan engine in accordance with another exemplary aspect of the present disclosure.

Reference will now be made briefly to FIG. 15. FIG. 15 provides a schematic view of an engine 900 in accordance with another exemplary embodiment of the present disclosure. The exemplary embodiment of FIG. 15 may be configured in substantially the same manner as the exemplary engines described above. However, as will be appreciated, for the embodiment shown, the engine 900 is configured as a three-spool engine, instead of a two-spool engine.

For example, the exemplary engine 900 includes a fan section 902 and a turbomachine 904. The fan section includes a fan 906. The turbomachine includes a first compressor 908, a second compressor 910, a combustion section 912, a first turbine 914, a second turbine 916, and a third turbine 918. The first compressor 908 may be a high pressure compressor, the second compressor 910 may be a medium pressure compressor (or intermediate pressure compressor), the first turbine 914 may be a high pressure turbine, the second turbine 916 may be a medium pressure turbine (or intermediate pressure turbine), and the third turbine 918 may be a low pressure turbine. Further, the engine 900 includes a first shaft 920 extending between, and rotatable with both of, the first compressor 908 and first turbine 914; a second shaft 922 extending between, and rotatable with both of, the second compressor 910 and second turbine 916; and a third shaft 924 extending between, and rotatable with both of, the third turbine 918 and fan 906. In such a manner, it will be appreciated that the engine 900 may be referred to as a three-spool engine.

For the embodiment of FIG. 15, the term redline EGT refers to a maximum temperature of an airflow after the first stator downstream of the last stage of rotor blades of the intermediate speed turbine, e.g., at location 926 in FIG. 15

(assuming the intermediate speed turbine 916 includes a stage of stator vanes downstream of the last stage of rotor blades).

It will further be appreciated that the exemplary cooled cooling air systems described hereinabove are provided by way of example only. In other exemplary embodiments, aspects of one or more of the exemplary cooled cooling air systems depicted may be combined to generate still other exemplary embodiments. For example, in still other exemplary embodiments, the exemplary cooled cooling air system may not be utilized with a thermal transport bus and instead may directly utilize a CCA heat exchanger positioned within the fan duct. Similarly, in other example embodiment, the exemplary cooled cooling air systems of FIGS. 12 through 14 may be utilized with a thermal transport bus to reject heat for the CCA heat exchanger. Additionally, although the exemplary cooled cooling air systems depicted schematically in FIGS. 12 through 14 depict the duct assembly as positioned outward of the working gas flow path along the radial direction R, in other exemplary embodiments, the duct assemblies may extend at least partially inward of the working gas flow path along the radial direction R.

Moreover, it will be appreciated that in still other exemplary aspects, the gas turbine engine may include additional or alternative technologies to allow the gas turbine engine to accommodate higher temperatures while maintaining or even increasing the maximum turbofan engine thrust output, as may be indicated by a reduction in the high pressure compressor exit area, without, e.g., prematurely wearing on various components within the turbomachine exposed to the working gas flowpath.

For example, in additional or alternative embodiments, a gas turbine engine may incorporate advanced materials capable of withstanding the relatively high temperatures at downstream stages of a high pressure compressor exit (e.g., at a last stage of high pressure compressor rotor blades), and downstream of the high pressure compressor (e.g., a first stage of an HP turbine, downstream stages of the HP turbine, an LP turbine, an exhaust section, etc.).

In particular, in at least certain exemplary embodiments, a gas turbine engine of the present disclosure may include an airfoil (e.g., rotor blade or stator vane) in one or more of the HP compressor, the first stage of the HP turbine, downstream stages of the HP turbine, the LP turbine, the exhaust section, or a combination thereof formed of a ceramic-matrix-composite or "CMC." As used herein, the term CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

One or more of these components formed of a CMC material may include an environmental-barrier-coating or "EBC." The term EBC refers to a coating system including one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., including barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

In such a manner, it will be appreciated that the EBCs may generally be suitable for application to "components" found in the relatively high temperature environments noted above. Examples of such components can include, for example, combustor components, turbine blades, shrouds, nozzles, heat shields, and vanes.

Additionally, or alternatively still, in other exemplary embodiments, a gas turbine engine of the present disclosure may include an airfoil (e.g., rotor blade or stator vane) in one or more of an HP compressor, a first stage of an HP turbine, downstream stages of the HP turbine, an LP turbine, an exhaust section, or a combination thereof formed in part, in whole, or in some combination of materials including but not limited to titanium, nickel, and/or cobalt based superalloys (e.g., those available under the name Inconel® available from Special Metals Corporation). One or more of these materials are examples of materials suitable for use in an additive manufacturing processes.

Further, it will be appreciated that in at least certain exemplary embodiments of the present disclosure, a method of operating a gas turbine engine is provided. The method may be utilized with one or more of the exemplary gas turbine engines discussed herein and may include operating the gas turbine engine at a takeoff power level, the gas turbine engine having a turbomachine with a high pressure compressor defining a high pressure compressor exit area ($A_{HPCExit}$) in square inches. The gas turbine engine further defines a redline exhaust gas temperature (EGT) in degrees Celsius, a total sea level static thrust output ($Fn_{Total}$) in pounds, and a corrected specific thrust. The corrected specific thrust is greater than or equal to 42 and less than or equal to 90, the corrected specific thrust determined as follows: $Fn_{Total} \times EGT/(A_{HPCExit}^2 \times 1000)$.

In certain exemplary aspects, operating the gas turbine engine at the takeoff power level further includes reducing a temperature of a cooling airflow provided to a high pressure turbine of the gas turbine engine with a cooled cooling air system. For example, in certain exemplary aspects, reducing the temperature of the cooling airflow provided to the high pressure turbine of the gas turbine engine with the cooled cooling air system comprises providing a temperature reduction of the cooling airflow equal to at least 15% of the EGT and up to 45% of the EGT.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

In various exemplary embodiments, the fan may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 6 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: a core turbine engine comprising a low pressure turbine; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is the chord length of a fan blade of the plurality of fan blades, S is a span of the fan blade, rr is a radius ratio of the fan, $\gamma$ is the stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between the leading edge of one of the plurality of fan blades and the inlet to the fan, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and an inlet-to-nacelle (ITN) ratio is defined as a ratio of the inlet length to a maximum diameter of the nacelle, wherein the ASR of the gas turbine engine is 1.5 to 16.0 and the ITN ratio is 0.23 to 0.35, and wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT / (A_{HPCExit}^2 \times 1000)$.

The gas turbine engine of the preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any preceding clause, also including a disk-to-inlet length (DIL) ratio defined as a ratio of a disk spacing length to the inlet length, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any preceding clause, further comprising a fan pressure ratio from 1.25 to 1.45.

The gas turbine engine of any preceding clause, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The gas turbine engine of any preceding clause, wherein the fan case further comprises an acoustic treatment disposed on an interior surface of the fan case, and, optionally, the acoustic treatment length is 50% to 90% of an inlet length.

The gas turbine engine of any preceding clause, wherein the number of the plurality of outlet guide vanes is at least twice the number of the plurality of fan blades.

The gas turbine engine of any preceding clause, wherein the low pressure turbine comprises at least three low pressure turbine stages or at least four low pressure turbine stages.

The gas turbine engine of any preceding clause, wherein plurality of outlet guide vanes further comprise serrated leading edges.

The gas turbine engine of any preceding clause, wherein the plurality of fan blades comprise composite materials that include a matrix and a plurality of fiber plies.

The gas turbine engine of any preceding clause, wherein the plurality of fiber plies are interwoven in in-plane and out-of-plane orientations, and/or the plurality of fiber plies are interwoven in three or more different orientation angles.

The gas turbine engine of any preceding clause, wherein a fan blade diameter of the fan blade is 65-80 inches, 80-95 inches, or 95-115 inches.

The gas turbine engine of any preceding clause, wherein the number of the plurality of fan blades is 14-26, 20-24, or 20-22.

The gas turbine engine of any preceding clause, wherein the blade solidity is 0.8 to 1.5, 1.0 to 2.0, or 1.25 to 1.75.

The gas turbine engine of any preceding clause, wherein the gas turbine engine has a bypass ratio of 10:1 to 17:1 or 12:1 to 15:1.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:
a core engine comprising a compressor section, a combustion section, and a turbine section arranged in serial flow order, the turbine section including a low pressure turbine and the compressor section having a high pressure compressor defining a high pressure compressor exit area ($A_{HPCExit}$) in square inches;
a gearbox assembly coupled to the low pressure turbine;
a fan coupled to the gearbox assembly and having a fan diameter and a plurality of fan blades with a blade solidity that is greater than or equal to 0.8 and less than or equal to 2.0;
a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, γ is a stagger angle of the fan blade, and $N_b$ is the number of the plurality of fan blades;
a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade;
a plurality of outlet guide vanes disposed aft of the fan and extending radially between the core engine and the fan case;
an acoustic spacing from the fan blade trailing edge to an outlet guide vane leading edge;
an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; and
an inlet-to-nacelle (ITN) ratio defined as a ratio of the inlet length to a maximum diameter of the nacelle,
wherein the ASR of the gas turbine engine is 1.5 to 16.0, and the ITN ratio is 0.23 to 0.35, and
wherein the gas turbine engine defines a redline exhaust gas temperature (EGT) in degrees Celsius, a total sea level static thrust output ($Fn_{Total}$) in pounds, and a corrected specific thrust,
wherein the corrected specific thrust is greater than or equal to 42 and less than or equal to 90, the corrected specific thrust determined as follows: $Fn_{Total} \times EGT / (A_{HPCExit}^2 \times 1000)$.

2. The gas turbine engine of claim 1, further comprising a disk-to-blade diametric (DBD) ratio defined as a ratio of a disk spacing length to the fan diameter, the disk spacing length being a distance between a forwardmost end of a fan disk and an intersection with the inlet taken along an engine centerline,
wherein the DBD ratio of the gas turbine engine is 0.09 to 0.59.

3. The gas turbine engine of claim 2, wherein the DBD ratio of the gas turbine engine is 0.15 to 0.35.

4. The gas turbine engine of claim 2, wherein the DBD ratio of the gas turbine engine is 0.19 to 0.27.

5. The gas turbine engine of claim 1, wherein the EGT is greater than 1000 degrees Celsius and less than 1300 degrees Celsius.

6. The gas turbine engine of claim 1, wherein the EGT is greater than 1100 degree Celsius and less than 1250 degrees Celsius.

7. The gas turbine engine of claim 1, wherein the EGT is greater than 1150 degree Celsius and less than 1250 degrees Celsius.

8. The gas turbine engine of claim 1, wherein the EGT is greater than 1000 degree Celsius and less than 1300 degrees Celsius, and wherein the corrected specific thrust is greater than or equal to 45.

9. The gas turbine engine of claim 1, wherein the EGT is greater than 1000 degree Celsius and less than 1300 degrees Celsius, and wherein the corrected specific thrust is greater than or equal to 50.

10. The gas turbine engine of claim 1, wherein the turbine section comprises a high pressure turbine having a first stage of high pressure turbine rotor blades, and wherein the gas turbine engine further comprises:
a cooled cooling air system in fluid communication with the first stage of high pressure turbine rotor blades.

11. The gas turbine engine of claim 1, wherein the gas turbine engine defines a bypass passage, and wherein the gas turbine engine defines a third stream extending from a location downstream of a secondary fan to the bypass passage.

12. The gas turbine engine of claim 1, further comprising a disk-to-inlet length (DIL) ratio defined as a ratio of a disk spacing length to the inlet length, the disk spacing length being a distance between a forwardmost end of a fan disk and an intersection with the inlet taken along an engine centerline,
wherein the DIL ratio of the gas turbine engine is 0.30 to 0.80.

13. The gas turbine engine of claim 12, wherein the DIL ratio of the gas turbine engine is 0.30 to 0.70.

14. The gas turbine engine of claim 12, wherein the DIL ratio of the gas turbine engine is 0.49 to 0.65.

15. The gas turbine engine of claim 1, further comprising a fan pressure ratio from 1.25 to 1.45.

16. The gas turbine engine of claim 1, wherein the ASR is 4.0 to 14.0.

17. The gas turbine engine of claim 1, wherein the ASR is 6.6 to 13.5.

18. The gas turbine engine of claim 1, wherein the fan case further comprises an acoustic treatment disposed on an interior surface of the fan case.

19. The gas turbine engine of claim 18, wherein a length of the acoustic treatment is 50% to 90% of the inlet length.

20. The gas turbine engine of claim 1, wherein the low pressure turbine comprises at least three low pressure turbine stages.

* * * * *